United States Patent [19]
Kodaira

[11] Patent Number: 5,749,012
[45] Date of Patent: May 5, 1998

[54] CAMERA

[75] Inventor: Takanori Kodaira, Kanagawa-ken, Japan

[73] Assignee: Canon Kabushiki Kaisha, Tokyo, Japan

[21] Appl. No.: 762,692

[22] Filed: Dec. 12, 1996

Related U.S. Application Data

[63] Continuation of Ser. No. 248,512, May 24, 1994, abandoned.

Foreign Application Priority Data

[30] May 31, 1993 [JP] Japan ................... 5-149811

[51] Int. Cl.⁶ ........................................... G03B 17/00
[52] U.S. Cl. ........................................ 396/435; 396/436
[58] Field of Search ......................... 354/94, 159, 173.1, 354/105, 106; 396/435, 436

[56] References Cited

U.S. PATENT DOCUMENTS

| | | | |
|---|---|---|---|
| 3,373,440 | 3/1968 | Jenkins et al. | 354/105 |
| 4,973,997 | 11/1990 | Harvey | 354/105 |
| 5,107,209 | 4/1992 | Ohsawa | 354/173.1 |
| 5,526,080 | 6/1996 | Cho | 354/159 |
| 5,583,593 | 12/1996 | Terada | 396/435 |
| 5,600,386 | 2/1997 | Saito et al. | 396/315 |
| 5,604,552 | 2/1997 | Ikeno | 396/436 |

FOREIGN PATENT DOCUMENTS

| | | | |
|---|---|---|---|
| 52-119223 | 10/1977 | Japan . | |
| 61-43698 | 9/1986 | Japan . | |
| 3153225 | 7/1991 | Japan | 354/94 |
| 635036 | 2/1994 | Japan | 354/94 |

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

A camera arranged to permit photographing by taking full advantage of a spurious telephoto shooting function irrespective of the current state of facilities of photofinishing laboratories is provided with an image plane frame change-over mechanism which acts in response to mode selection made by a mode change-over switch to effect change-over of the size of an image plane frame between a normal image plane frame having a normal image plane frame size and a spurious telephoto image plane frame having a size not exceeding ½ of the normal image plane frame size and a restricting member which causes a shooting image plane set by the spurious telephoto image plane frame to become containable within a range of film usable in taking a panorama shot. Therefore, in the spurious telephoto mode, a spurious telephoto shot is taken within the range of film for a panorama shot.

14 Claims, 17 Drawing Sheets

(NORMAL MODE)

(PANORAMA MODE)

(SPURIOUS TELEPHOTO MODE)

F I G. 17
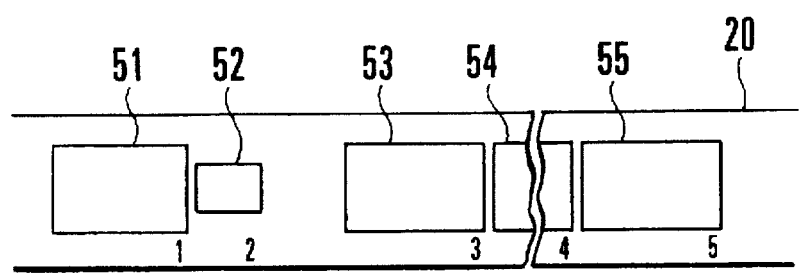
F I G. 19
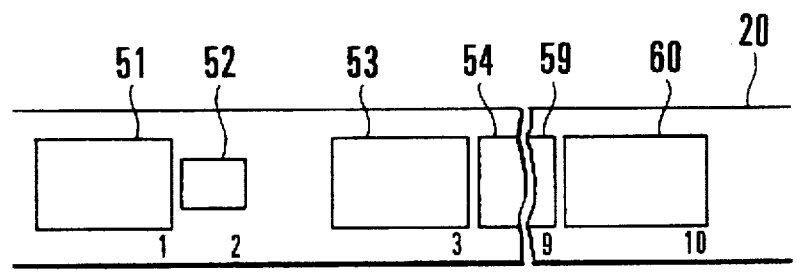

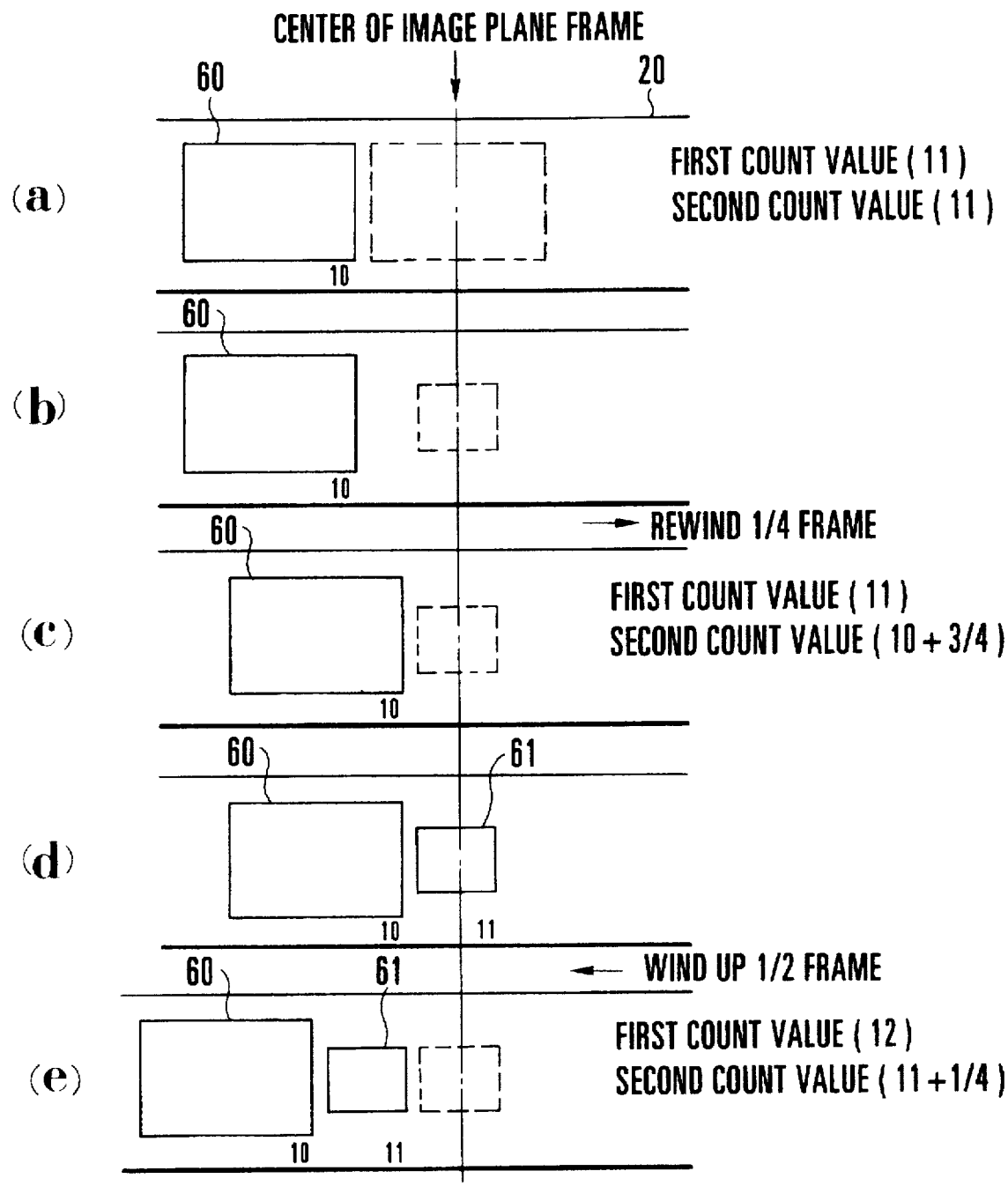

CAMERA

This application is a continuation of application Ser. No. 08/248,512 filed May 24, 1994, now abandoned.

BACKGROUND OF THE INVENTION

1. Field of the Invention

This invention relates to a camera or an optical apparatus arranged to be capable of varying the image recording areas of an image recording medium.

2. Description of the Related Art

Cameras arranged to give panorama pictures by changing the size of a normal (standard) image plane frame to a so-called panorama size by covering the upper and lower parts of the normal image plane frame which defines a shooting range of a normal size and by taking a shot on the panorama size image plane, have already been manufactured as commercial products during recent years.

For such panorama size pictures, photofinishing laboratories have already been prepared to print any roll of film containing exposed frames of the normal size and those of the panorama size in a commingled state. A printing paper of a special large oblong shape is used for printing panorama pictures in general.

On the other hand, cameras of another kind arranged to permit taking a so-called spurious telephoto shot of a high rate of magnification by covering four sides of the image plane frame of the normal (standard) size with mask members to make it smaller and to permit taking a picture on the smaller image plane and by enlarging the picture of the smaller size to the normal standard size in printing it, have been disclosed, for example, in Japanese Patent Application Laid-Open No. SHO 52-119223, Japanese Patent Publication No. SHO 61-43698, etc.

In printing a film exposed by the camera of the above-stated kind, it is necessary, unlike the panorama printing, to read out a magnification ratio written on the film surface at the time of shooting and to enlarge the picture according to the ratio. However, at present, the photofinishing laboratories have not been sufficiently prepared to meet this requirement. Therefore, at present, it is hardly possible to take advantage of the spurious telephoto shooting function of the camera of that kind.

SUMMARY OF THE INVENTION

One aspect of this invention lies in providing a camera or a shooting image plane setting device for the camera which is arranged to permit photographing by effectively taking full advantage of a panorama shooting image plane to set a different shooting image plane. The camera or the shooting image plane setting device according to this invention is provided with first setting means for setting a panorama shooting image plane in which a ratio of a horizontal length thereof to a vertical length thereof is larger than that of a normal shooting image plane, and second setting means for setting a shooting image plane inside the panorama shooting image plane set by said first setting means.

Another aspect of this invention lies in providing a camera which is of the kind permitting switch-over selection from among a plurality of different shooting image planes including nonstandard image planes such as a panorama shooting image plane, a spurious telephoto shooting image plane, etc., and is arranged to be capable of efficiently switching one shooting image plane over to another. The camera according to this invention is provided with first shooting image plane forming means for forming a first nonstandard shooting image plane which differs from a normal shooting image plane by blocking a part of the normal shooting image plane from light, and second shooting image plane forming means for forming a second nonstandard shooting image plane by dividing the first nonstandard shooting image plane into a plurality of substantially equal areas and by arranging at least one of the substantially equally divided areas to be usable as the second shooting image plane.

These and other aspects and features of this invention will become apparent from the following detailed description of embodiments thereof taken in connection with the accompanying drawings.

BRIEF DESCRIPTION OF THE DRAWINGS

FIG. 17 is a plan view showing the shooting ranges of the frames obtained with shots taken in different modes in an order which differs from the order shown in FIG. 8.

FIG. 19 is a plan view showing the shooting ranges of the frames obtained with shots taken in different modes in an order which differs from the order shown in FIG. 17.

FIG. 20 shows transitions taking place in a positional relation between a film and image plane frames when shots are taken in different modes in the order of FIG. 19 with the value "N" set at a value larger than the predetermined value.

DETAILED DESCRIPTION OF THE PREFERRED EMBODIMENTS

Figure 1:
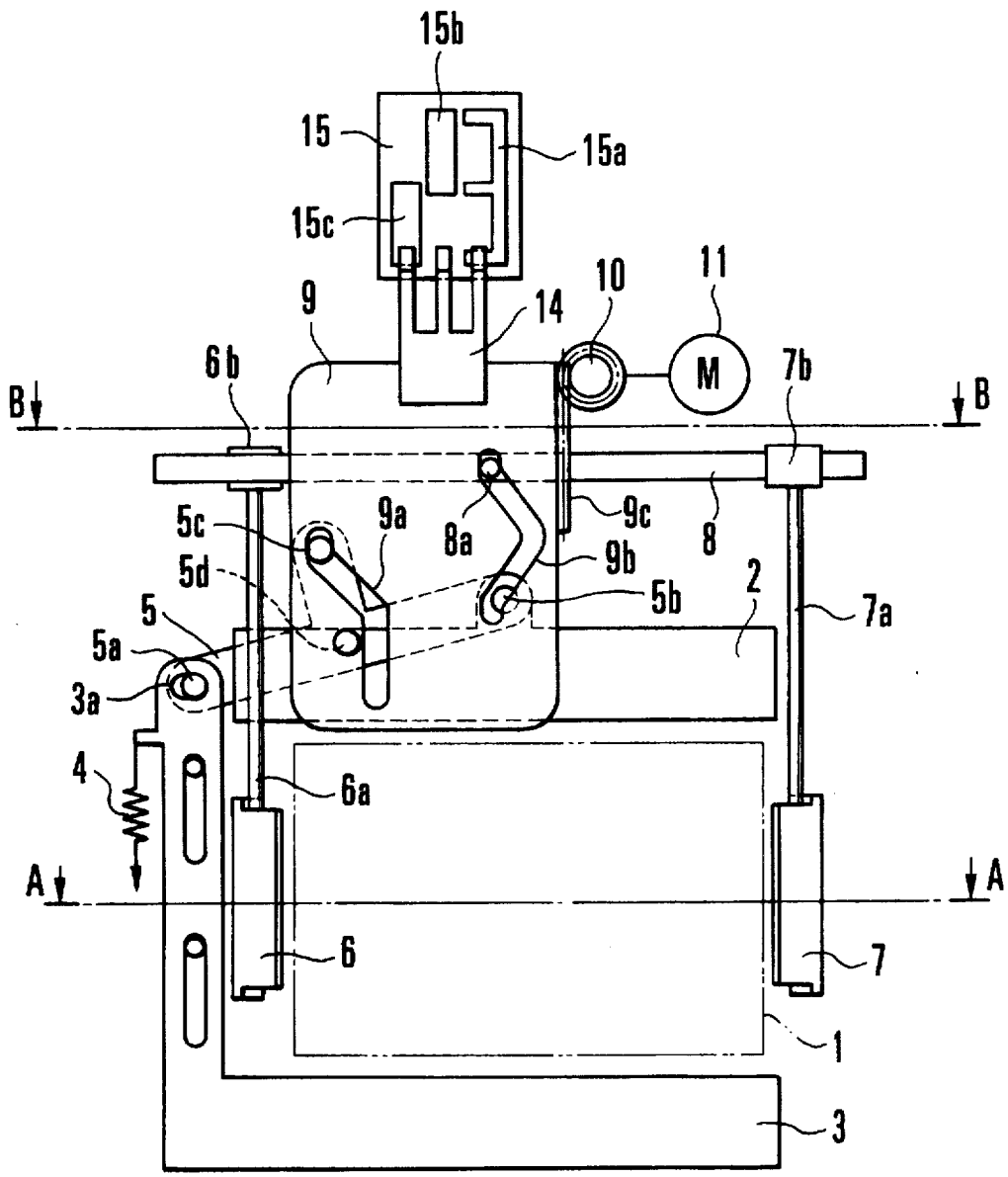
FIG. 1 is a front view showing a camera which has a spurious telephoto (shooting) function and arranged as an embodiment of this invention, the camera being shown in a state of having its members in a positional relation for a normal shooting mode.
Figure 2:
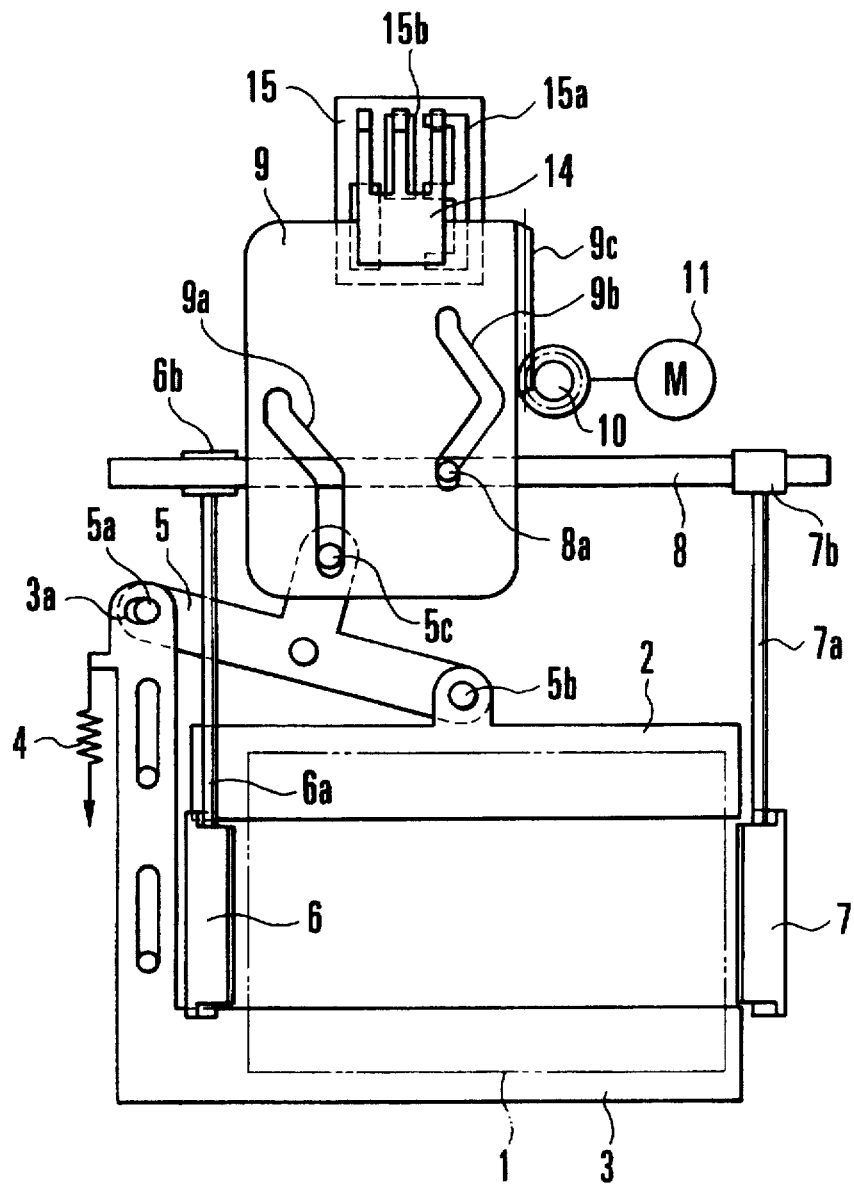
FIG. 2 is a front view showing the members of the same camera in a positional relation which is obtained when an image plane frame size is switched over to an image plane frame size for a panorama shooting mode.
Figure 3:
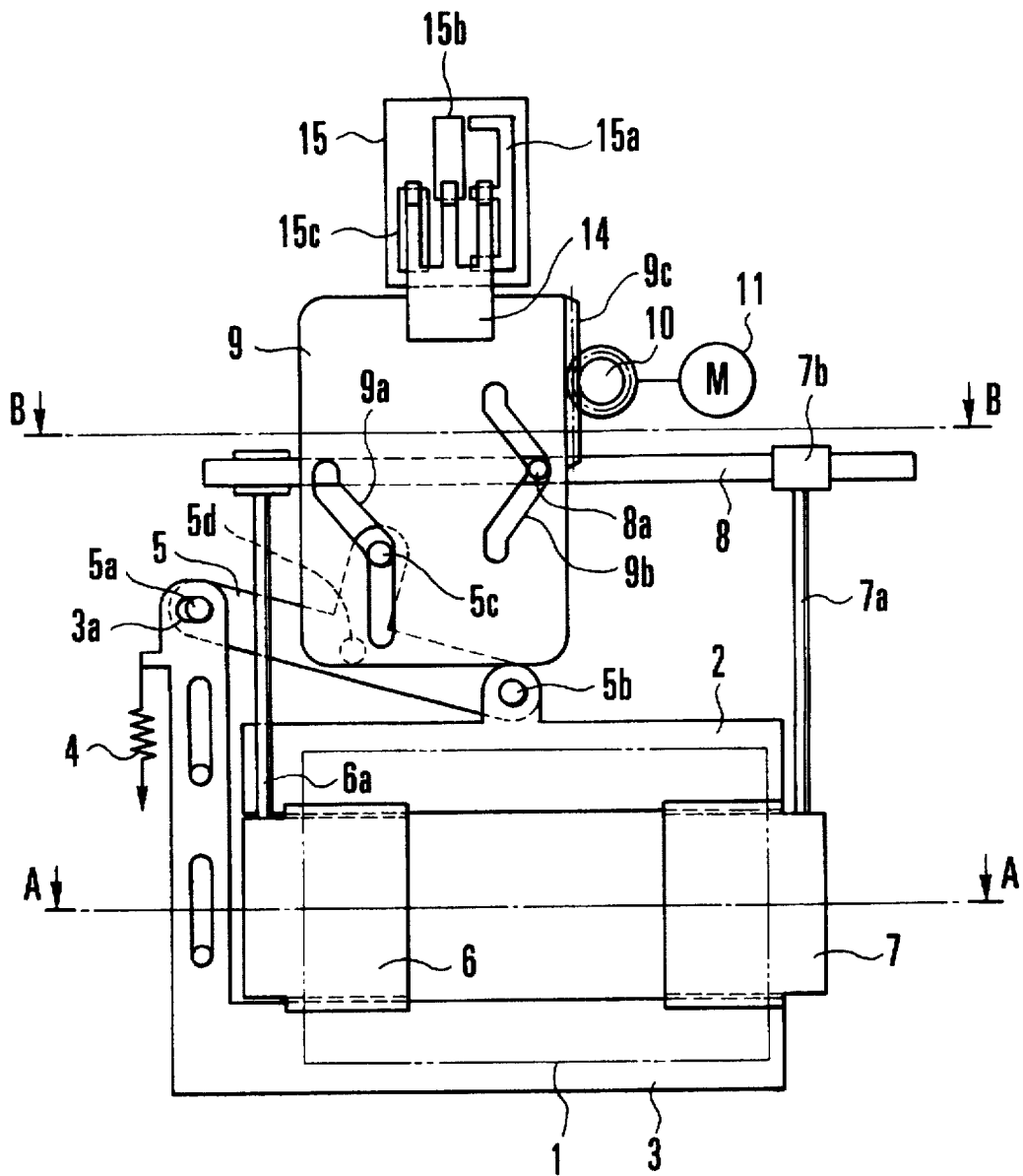
FIG. 3 is a front view showing the members of the same camera in a positional relation which is obtained with the image plane frame size switched over to an image plane frame size for a spurious telephoto shooting mode.
Figure 4:
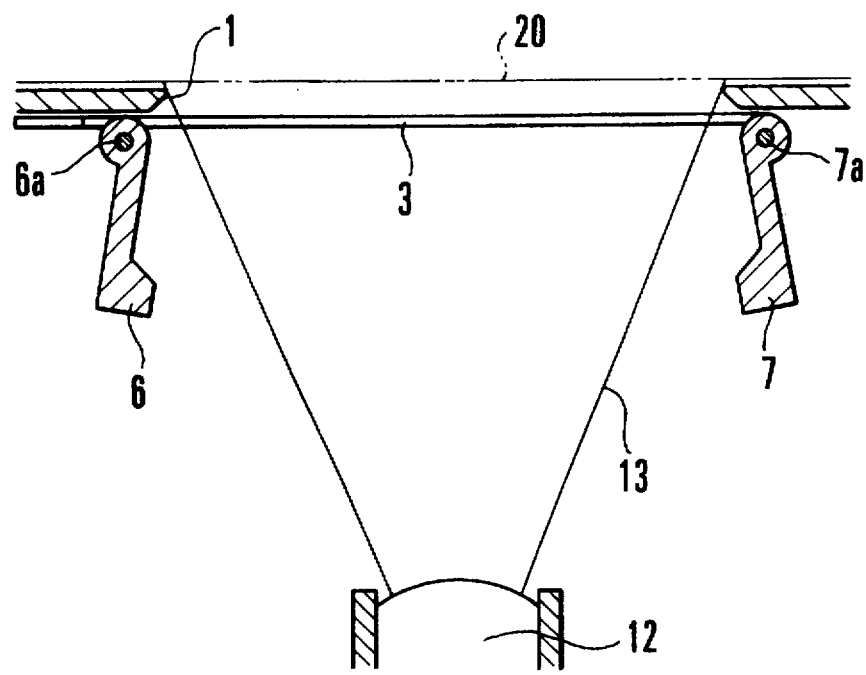
FIG. 4 is a sectional view taken on line A—A of FIG. 1.
Figure 5:
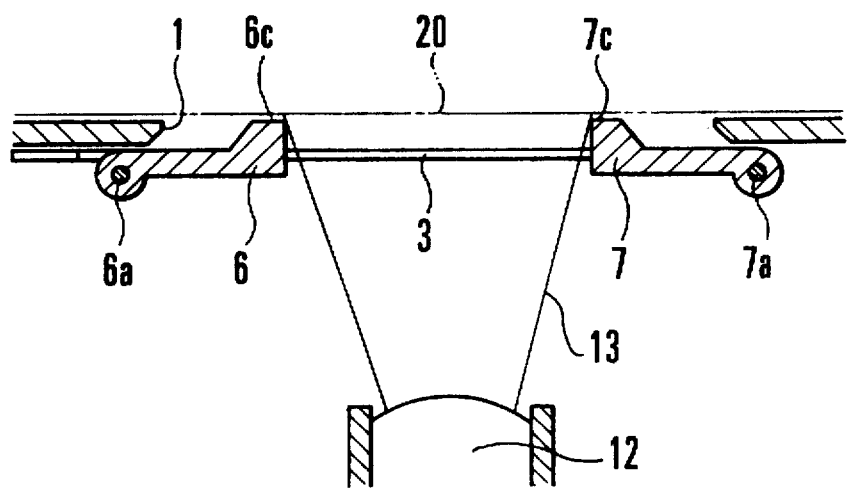
FIG. 5 is a sectional view taken on line A—A of FIG. 3.
Figure 6:
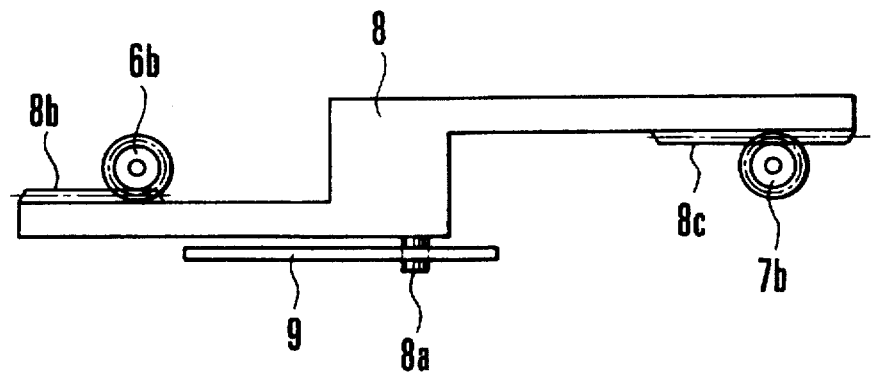
FIG. 6 is a view taken on line B—B of FIG. 1.
Figure 7:
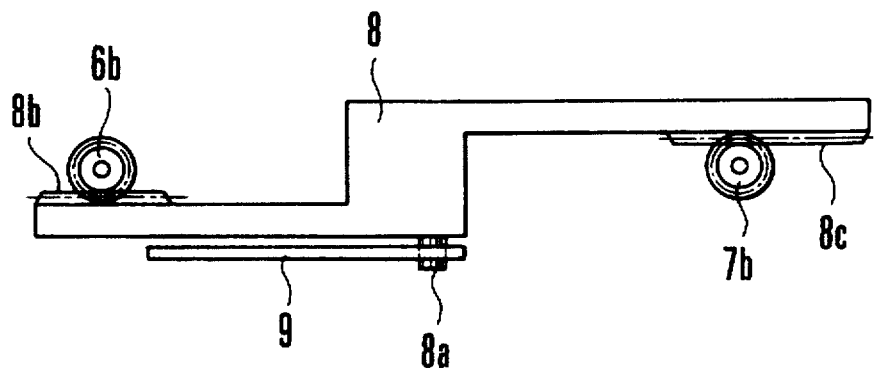
FIG. 7 is a view taken on line B—B of FIG. 3.

The details of this invention are described through an embodiment thereof with reference to the accompanying drawings as follows:

FIGS. 1, 2 and 3 show how the size of the image plane frame of a camera which has a spurious telephoto shooting function and is arranged as an embodiment of this invention is switched from one size over to another. FIG. 1 shows a positional relation obtained among the members of the camera with the camera in its normal (shooting) mode. FIG. 2 shows a positional relation obtained among the members when the camera is in a panorama (shooting) mode. FIG. 3 shows a positional relation obtained among the members when the camera is in a spurious telephoto (shooting) mode. FIG. 4 is a sectional view taken on a line A—A shown in FIG. 1. FIG. 5 is a sectional view taken on a line A—A shown in FIG. 3. FIG. 6 is a view taken on line B—B shown in FIG. 1. FIG. 7 is a view taken on line B—B shown in FIG. 3.

In these figures, frame 1 is arranged to define a shooting range in a normal (or standard) size. Light blocking plates 2 and 3 which have a property of blocking light are arranged to be movable from their retracted positions to positions where they cover the upper and lower parts of the frame 1. An interconnecting lever 5 is carried by a shaft 5d to be rotatable on the shaft 5d and has three arm parts. Protruding parts 5a, 5b and 5c are formed at the fore ends of these arm parts. The protruding part 5a is fitted into a slot 3a formed in the light blocking plate 3. The protruding part 5b is rotatably connected to the light blocking plate 2. The downward movement of the light blocking plate 2 causes the light blocking plate 3 to move upward. Since the light blocking plate 3 is constantly urged downward by a spring 4, the other light blocking plate 2 is urged upward.

A cam plate 9 is carried to be vertically slidable by a device which is not shown. Cam slots 9a and 9b are formed in the cam plate 9. The protruding part 5c of the interconnecting lever 5 is fitted into the cam slot 9a. A protruding part 8a provided on a slide lever 8 which will be described later is fitted into the other cam slot 9b. The cam plate 9 is further provided with a rack 9c which is arranged to mesh with a gear 10. The gear 10 is connected to an image plane frame change-over motor 11 through a reduction system. The cam plate 9 thus can be driven up and down by means of the motor 11.

A contact piece 14 which is secured to the cam plate 9 is arranged to slide over and in contact with patterns 15a, 15b and 15c provided on a circuit board 15 which is secured to the camera body, so that the moving position of the cam plate 9 can be detected.

Light blocking plates 6 and 7 having a light blocking property are swingable respectively on shafts 6a and 7a, which are secured to these light blocking plates 6 and 7. The arrangement is such that the light blocking plates 6 and 7 can be moved by turning them between a position where they are retracted away from the frame 1, as shown in FIGS. 1 and 2, and another position where they cover the right and left sides of the frame 1 as shown in FIG. 3. Gear parts 6b and 7b which mesh with the racks 8b and 8c of the slide lever 8 as shown in FIGS. 6 and 7 are secured respectively to the fore ends of the shafts 6a and 7a of the light blocking plate 6 and 7.

The slide lever 8 is arranged to be slidable in the right and left directions and is provided with the racks 8b and 8c for meshing with the gear parts 6b and 7b of the light blocking plates 6 and 7 as mentioned above. The slide lever 8 is further provided with the protruding part 8a which is fitted into the cam slot 9b.

Figure 8:
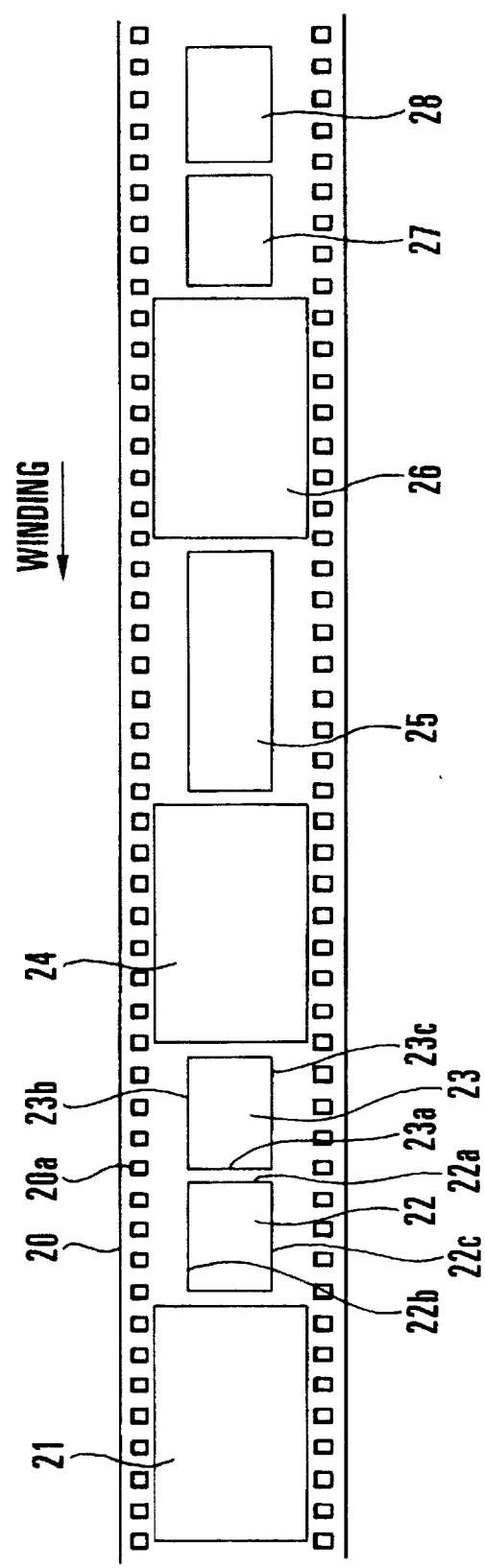
FIG. 8 is a plan view showing the shooting ranges of different frames obtained by taking shots in different modes with a camera which has the spurious telephoto shooting function and is arranged according to this invention as an embodiment thereof.

FIGS. 4 and 5 show a photo-taking lens 12, a photo-taking light flux 13 which comes through the photo-taking lens 12, and a film 20. FIG. 8 is a plan view of the film showing the shooting range of each of frames when shots are taken in different shooting modes including the normal mode, the panorama mode and the spurious telephoto mode with the camera which is arranged as described above.

Referring to FIG. 8, the film 20 mentioned above is provided with perforations 20a. In FIG. 8, reference numerals 21 to 28 denote the shooting ranges of exposed frames. The exposed frames 21, 24 and 26 are obtained by taking shots in the normal shooting mode. The exposed frames 22, 23, 27 and 28 are obtained by taking shots in the spurious telephoto shooting mode. (In the present description, while a portion of film on which a shot is taken using an image plane frame which is of the standard size and fed to a standard extent is expressed basically as "frame" or "exposed frame", a portion of film on which a shot is taken using the spurious telephoto shooting image plane frame is also expressed as "exposed frame" for the sake of expediency.) The exposed frame 25 is obtained with a shot taken in the panorama shooting mode.

Figure 9:
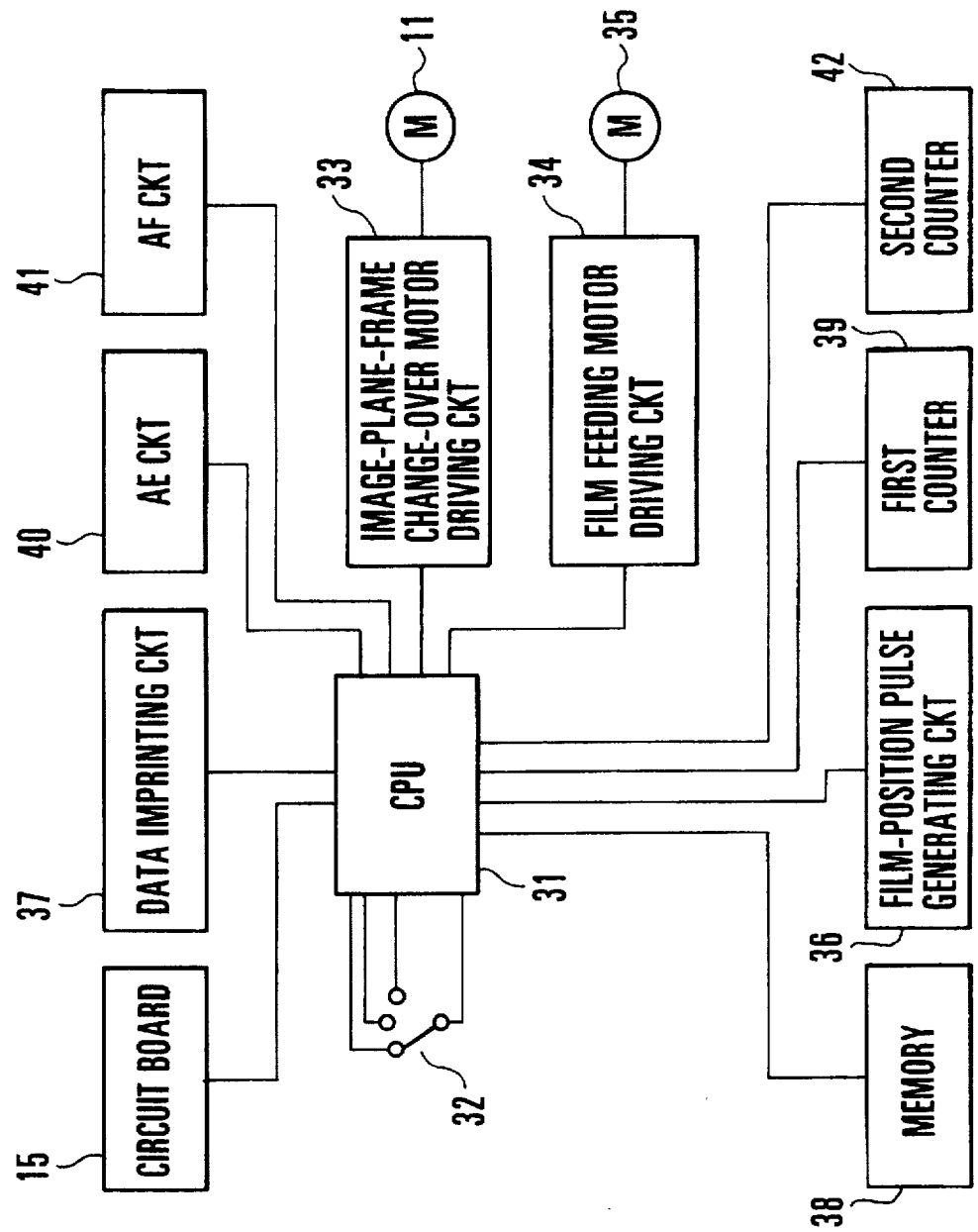
FIG. 9 is a block diagram showing the arrangement of essential parts of a camera which has the spurious telephoto shooting function and is arranged according to this invention as an embodiment thereof.

FIG. 9 shows in a block diagram the arrangement of essential parts of the camera which has the spurious telephoto shooting function and arranged as the embodiment of this invention. Referring to FIG. 9, a CPU 31 is arranged to control various actions of the camera. A mode change-over switch 32 is arranged to permit switch-over selection among the normal shooting mode, the spurious telephoto shooting mode and the panorama shooting mode. An image plane frame change-over motor driving circuit 33 is arranged to drive an image plane frame change-over motor 11 for changing one size (shooting range) of the image plane frame over to another shooting range according to an instruction given in response to the change-over operation performed on the mode change-over switch 32. A film feeding motor driving circuit 34 is arranged to drive a film feeding motor 35. A film position pulse generating circuit 36 is arranged to generate a pulse signal according to the movement of the perforations 20a of the film 20. A data imprinting circuit 37 is arranged in a known manner to imprint frame numbers indicative of the order of shooting at exposed frames. A memory 38 is arranged to store such information that becomes necessary in making a search for an unexposed frame according to a count value obtained by a second counter 42, etc.

A first counter 39 is arranged to update its count value by increments of one every time a shot is taken (even in a case where the shot is taken in the spurious telephoto shooting mode) and to count a value indicating a serial number of each shot as information to be imprinted (hereinafter, this value will be referred to as a first count value).

The second counter 42 is arranged to count the pulses of a pulse signal coming from the film position pulse generating circuit 36 irrespective of the shooting mode and, by assuming that one frame portion of the film is wound or rewound every time a multiple of 8 pulses are counted, to count a value which is to be used for information on an amount of film fed which is necessary in making a search for an unexposed frame (hereinafter, this count value will be referred to as a second count value). More specifically, the second counter 42 is an octal counter which takes its count value up or down one place every time eight pulses of the pulse signal from the film position pulse generating circuit 36 are counted irrespective as to whether a spurious telephoto shot or shots are taken using only the left half of or both the left and right halves of the normal image plane frame as will be described later. Further, the second counter 42 is arranged to count up every time a pulse signal is inputted from the film position pulse generating circuit 36 in winding the film 20 and to count down every time a pulse signal is inputted from the film position pulse generating circuit 36 in rewinding the film 20.

Reference numeral 40 denotes a known automatic exposure (AE) circuit. Reference numeral 41 denotes a known automatic focusing (AF) circuit. Reference numeral 15 denotes a circuit board which is secured to the camera body.

Next, the operations of the camera arranged as described above are described below with reference to the flow charts of FIGS. 10, 11 and 12 along with FIGS. 13 to 20 which show transitional changes taking place in feeding the film.

To begin with, the flow of operation to be performed in a case where shooting mode is switched from one mode over to another in the order of the modes shown in FIG. 8, that is, in the order of the normal mode (an exposed frame 21)—the spurious telephoto mode (an exposed frame 22)—the spurious telephoto mode (an exposed frame 23)—the normal mode (an exposed frame 24)—the panorama mode (an exposed frame 25)—the normal mode (an exposed frame 26)—the spurious telephoto mode (an exposed frame 27)—the spurious telephoto mode (an exposed frame 28) is described as follows:

At a step 101, the flow of operation waits for a switch input. When the mode change-over switch 32 is operated in this state, the flow comes to a step 102. At the step 102, a check is made for a shooting mode selected from among the normal mode, the spurious telephoto mode and the panorama mode. Since the normal mode is selected in the initial stage of the flow, the flow comes to a step 103. At the step 103, the electrical contact state of the patterns on the circuit board 15 is checked to find if the image plane frame has already been set in the size of the normal mode. With the image plane frame assumed to have previously been set in the size of the panorama mode in this instance, the flow comes to a step 104.

At the step 104, the image plane frame change-over motor 11 is driven through the image plane frame change-over motor driving circuit 33 until the cam plate 9 comes to its lower end position as shown in FIG. 1. In other words, the cam plate 9 slides downward together with the contact piece 14. The driving action of the image plane frame change-over motor 11 comes to a stop when the cam plate 9 comes to a position where the patterns 15a and 15c come into electrical contact with each other. The cam plate 9 comes to a stop in this position. Then, the cam slot 9a of the cam plate 9 and the protruding part 5c jointly cause the interconnecting lever 5 to turn round counterclockwise on the shaft 5d. The light blocking plates 2 and 3 which are connected to the protruding parts 5a and 5b of the interconnecting lever 5 are then respectively held away from the frame 1 in their retracted positions. Further, the cam slot 9b causes the slide lever 8 to move to its left end position as shown in FIG. 6. Following this movement, the gear part 6b turns around clockwise and the gear part 7b counterclockwise. As a result, the light blocking plates 6 and 7 are held away from the frame 1 in their retracted positions. In the normal mode, therefore, all the light blocking plates 2, 3, 6 and 7 are retracted away from the frame 1 to allow the image plane frame to be in the size defined by the frame 1.

At a step 105, the first counter 39 and the contents of the memory 38 are checked to find if the mode selected last time was the spurious telephoto mode. In this instance, since the panorama mode was selected last time, the flow comes to a step 115. At the step 115, a check is made to find if a release switch which is not shown has been turned on. If so, the flow comes to a step 116. If not, the flow comes back to the step 101. With the release switch assumed to be on in this instance, the flow comes to the step 116.

At the step 116, the AE and AF circuits 40 and 41 are caused to carry out the shooting actions such as focusing and exposure actions in the known manner. As a result, as shown in part (a) of FIG. 13, the exposed frame 21 is formed on the film 20.

Figure 13:
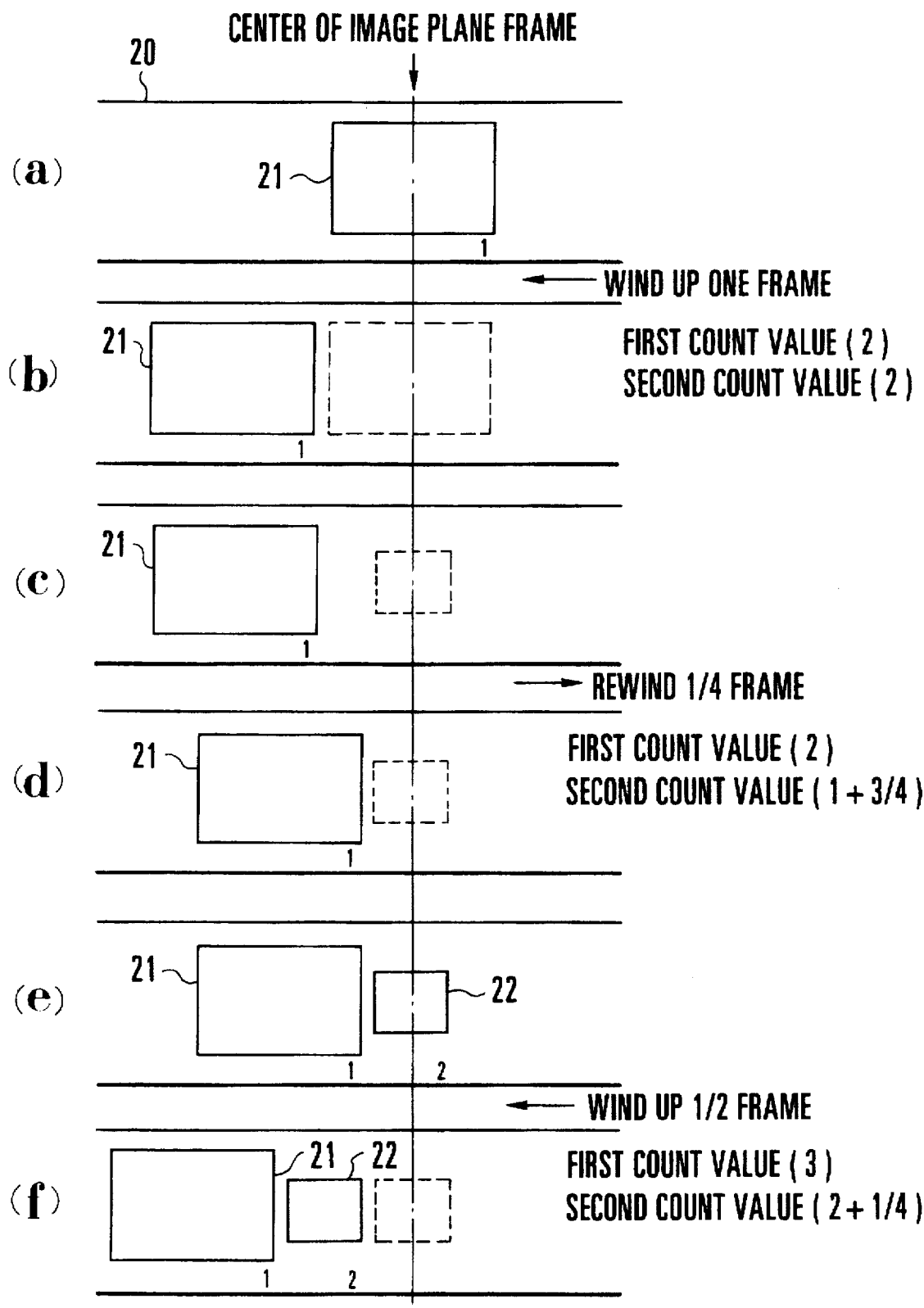
FIG. 13 shows transitions taking place in a positional relation between a film and image plane frames when shots are taken in different modes in the order of the image plane frames shown in FIG. 8.

At a step 117, the data imprinting circuit 37 is caused to imprint an exposed frame number "1" which is a serial number of shooting at the exposed frame 21, as indicated also at part (a) of FIG. 13. At a step 118, information about the shooting position on the film 20 is stored in the memory 38. The memory 38 is arranged to store the first and second count values of the first and second counters 39 and 42, the current shooting mode and, in the case of the spurious telephoto mode, information about whether shots have been taken covering only the left half of the normal shooting range or both the left and right halves of the normal shooting range.

At a step 119, the film feeding motor driving circuit 34 is caused to have the film 20 driven in the direction of winding by the film feeding motor 35. At a step 120, the second count value is counted up as much as the number of pulses of the pulse signal inputted from the film position pulse generating circuit 36. Since the second counter 42 counts eight pulses, the second count value is carried up one place to increment it to "2" in this instance. At a step 121, a check is made to find if the number of pulses of the pulse signal from the film position pulse generating circuit 36 has reached the number (eight) for one frame. If so, the flow comes to a step 122. At the step 122, since a film portion for one frame has been wound up, the driving action of the film feeding motor 35 is brought to a stop. At a step 123, the first count value is updated to bring it up to "2".

As a result, the image plane frame (the frame 1) which is formed with the light blocking plates 2, 3, 6 and 7 having been retracted is in a positional relation to the film 20 as shown at a part (b) of FIG. 13. Then, the first and second count values of the first and second counters 39 and 42 are as shown on the right side of part (b) of FIG. 13. After that, the flow comes back to the standby state of the step 101. Since the spurious telephoto (shooting) mode is selected by the mode change-over switch 32 this time, the flow shifts from the step 102 to a step 124 of FIG. 11.

At the step 124, the mode information of the memory 38 which corresponds to a count value obtained by subtracting "1" from the first count value of the first counter 39 is checked to find if the last mode has been the spurious telephoto mode. Since the last mode has been the normal mode in this instance, the flow comes to a step 125. At the step 125, the electrical contact state of the patterns on the circuit board 15 is checked to find if the image plane frame has already been set at the size for the spurious telephoto mode. If so, the flow comes to a step 134 of FIG. 11. However, since the image plane frame has been set in the size for the normal mode in this instance, the flow comes to a step 126.

At the step 126, the image plane frame change-over motor 11 is driven to move the contact piece 14 along with the cam plate 9. The image plane frame change-over motor 11 is brought to a stop at a position where the patterns 15a, 15b and 15c of the circuit board 15 come into electrical contact with each other. The cam plate 9 is then positioned at an intermediate point between its lower and upper ends as shown in FIG. 3. The protruding part 5c which is fitted into the cam slot 9a of the cam plate 9 then moves to the right along the cam slot 9a. The interconnecting lever 5, therefore, turns around clockwise to cause the light blocking plates 2 and 3 to be held in their positions of being inserted into the inside of the frame 1. Further, the protruding part 8a which is fitted into the cam slot 9b also moves to the right along the cam slot 9b. In other words, the slide lever 8 is moved to its right end position as shown in FIG. 7. Following this movement, the gear part 7b which meshes with the rack 8b of the slide lever 8 turns around clockwise. As a result, the light blocking plates 6 and 7 are held in their positions of being inserted into the inside of the frame 1.

Therefore, in the spurious telephoto mode, all the light blocking plates 2, 3, 6 and 7 are inserted into the inside of the frame 1 as shown in FIG. 3. The image plane frame is thus set in a size which is defined jointly by these light blocking plates 2, 3, 6 and 7 and is one half of the normal image plane frame size. In other words, the image plane frame which is as shown at part (b) of FIG. 13 is changed over to an image plane frame which is as shown at part (c) of FIG. 13.

At a step 127, the memory 38 is searched for any unexposed frame that is located before (in the direction of film rewinding) the film position for the current image plane frame (a frame where only the left half of the normal shooting range has been exposed in the case of the spurious telephoto mode). There is no unexposed part in this particular instance. At a step 128, the number N of frames rewound up to a frame (a frame where the left half of the normal shooting range is exposed) located before an unexposed frame is computed. Since there is no unexposed part in this instance, the value N is set at 0 (N=0).

At a step 129, the number N of rewound frames obtained by the step 128 is checked for its relation to a predetermined value, which is to be set by the nature of the camera but is assumed to be 5 frames in this instance. In other words, a check is made to find either if the number N is larger than 5 or if it is zero (N=0). Since N=0 in this instance, the flow branches to a step 143.

At the step 143, the film feeding motor driving circuit 34 is caused to have the film 20 driven in the direction of rewinding by the film feeding motor 35. At a step 144, the second count value is counted down as much as the number of pulses of the pulse signal inputted from the film position pulse generating circuit 36. Further, since the second counter 42 counts two pulses in this instance, the second count value becomes "14" pulses (hereinafter, it is expressed by the number of frames, in such a way as "1+¾", for example). At a step 145, a check is made to find if the number of pulses of the pulse signal from the film position pulse generating circuit 36 has reached a number for ¼ frame. In other words, the check is made to find if it has reached two pulses. If so, the flow comes to a step 146. This process is provided for the purpose of positioning the film 20 to make it possible to take a shot by using the left half of a frame located next to the last exposed frame 21. At the step 146, since rewinding ¼ frame amount of film has been finished, the driving action of the film feeding motor 35 is brought to a stop to terminate the process of rewinding the film 20.

By this action, the positional relation between the film 20 and the image pane frame defined by the light blocking plates 2, 3, 6 and 7 is changed from the relation shown at part (c) of FIG. 13 to a relation as shown at another part (d) in FIG. 13. Further, at this point of time, the second count value of the second counter 42 has been changed, as apparent from the above description, to the value as shown on the right side of part (d) of FIG. 13. At a step 147, a check is made to find if a release switch which is not shown has been turned on. If so, the flow comes to a step 148. If not, the flow goes back to the step 101.

Since the release switch has been turned on in this instance, the flow comes to the step 148. At the step 148, shooting actions such as the focusing and exposure actions of the AE and AF circuits 40 and 41 are carried out. As a result, an exposed frame 22 is formed on the film 20 as shown at part (e) of FIG. 13.

At a step 149, as shown at the part (e) of FIG. 13, the first count value obtained by the first counter 39, i.e., an exposed frame number "2" which is a serial number of shooting, is imprinted at the exposed frame 22. At a step 150, the shooting, or exposed, position of the film 20 is stored in the memory 38. More specifically, in this instance, the current first count value (2) and the current second count value (1+¾) of the first and second counters 39 and 42, the fact that the current mode is the spurious telephoto mode and the fact that the shot taken is recorded in the left half of the frame, are stored in the memory 38.

At a step 151, the film feeding motor driving circuit 34 is causes the film 20, driven by the film feeding motor 35, in the direction of film winding. At a step 152, the second count value is counted up as much as the number of pulses of the pulse signal inputted from the film position pulse generating circuit 36. At this time, the second counter 42 counts four pulses. The second count value, therefore, becomes "2+¼". At a step 153, a check is made to find if the number of pulses of the pulse signal from the film position pulse generating circuit 36 has reached a value for b ½ frame. In other words, the check is made to find if it has reached four pulses. If so, the flow comes to a step 154. At the step 154, since the process of winding ½ frame amount of film has been finished, the driving action of the film feeding motor 35 is brought to a stop to terminate the process of winding the film 20. At a step 155, the first count value is updated to bring it up to "3".

Through the processes described above, the positional relation between the film 20 and the image plane frame which is formed by inserting the light blocking plates 2, 3, 6 and 7 changes from the relation shown at part (e) of FIG. 13 to a relation shown at part (f) of FIG. 13. Further, as apparent from the description given above, the first and second count values obtained within the first and second counters 39 and 42 become values indicated on the right side of part (f) of FIG. 13.

Figure 10:
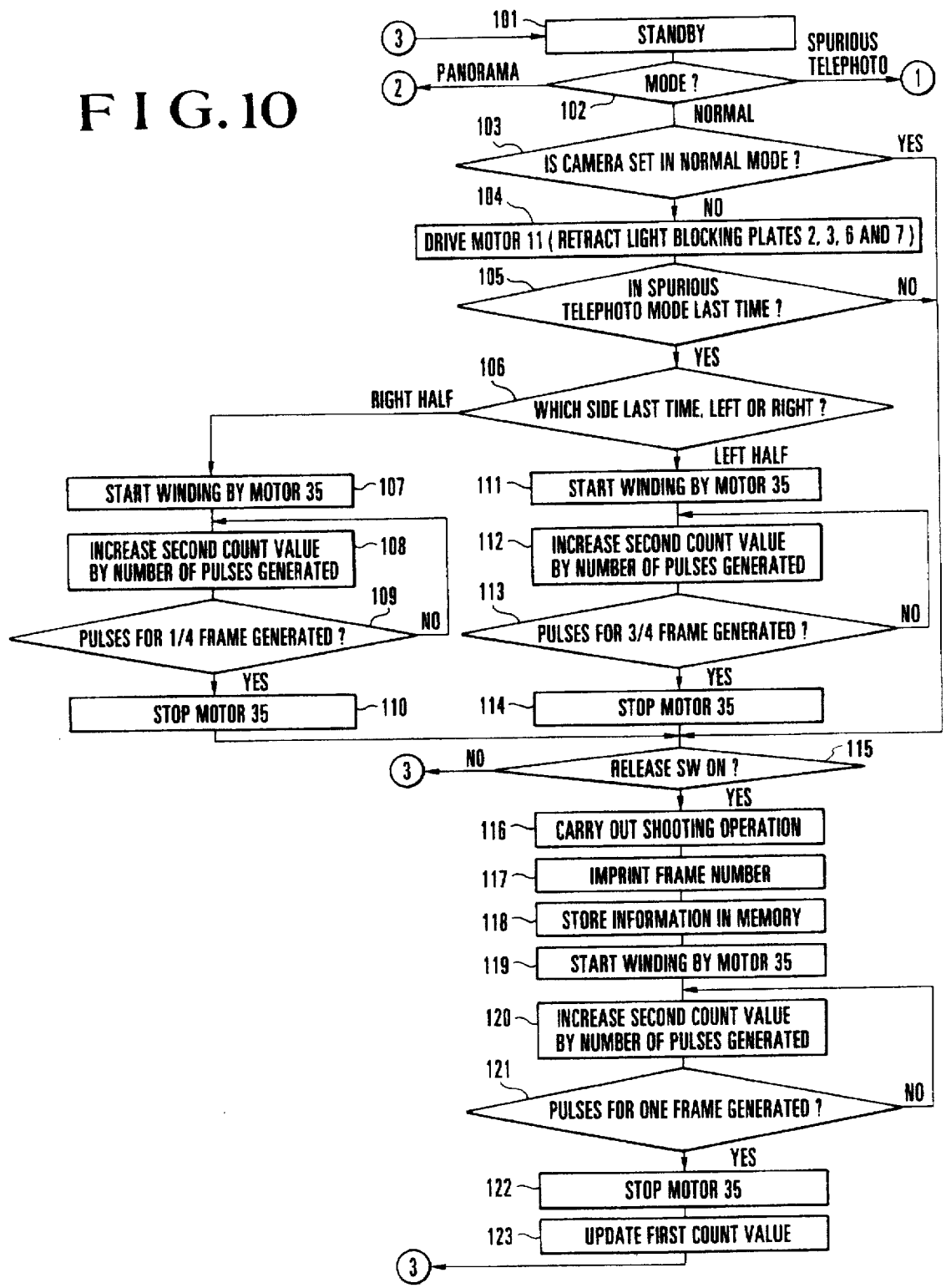
FIG. 10 is a flow chart showing the actions of essential parts of a CPU shown in FIG. 9.

After that, the flow comes back to the standby state of the step 101 of FIG. 10. Since the spurious telephoto mode is selected also this time by the mode change-over switch 32, the flow of operation again shifts from the step 102 to the step 124 of FIG. 11.

At the step 124, like in the previous round of flow described above, the contents of the first counter 39 and the memory 38 are checked to find if the previous mode is the spurious telephoto mode. Since it was also the spurious telephoto mode last time, the flow comes to the step 147. At the step 147, a check is made to find if the release switch which is not shown has been turned on. With the release switch assumed to have been turned on in this instance, the flow comes to the step 148. At the step 148, the shooting actions such as the focusing and exposure actions of the AE and AF circuits 40 and 41 are carried out. Through these actions, an exposed frame 23 is formed on the film 20 as shown at part (g) of FIG. 14. At the step 149, the first count value obtained by the first counter 39, i.e., an exposed frame number "3" which is a serial number of shooting is imprinted at the exposed frame 23 as shown at part (g) of FIG. 14.

At the step 150, the exposed position of the film 20 is stored in the memory 38. In this instance, the first count value (3) and the second count value (2+¼) obtained respectively by the first and second counters 39 and 42, the fact that the current mode is the spurious telephoto mode and the fact that a shot has been taken by using the right half of the frame, are stored in the memory 38.

At the step 151, the film feeding motor driving circuit 34 causes the film 20 driven in the direction of film winding by the film feeding motor 35. At the step 152, the second count value is counted up as much as the number of pulses of the pulse signal inputted from the film position pulse generating circuit 36. At this time, since the second counter 42 counts four pulses, the second count value becomes "2+¾". At the step 153, a check is made to find if the number of pulses of the pulse signal from the film position pulse generating circuit 36 has reached a number for ½ frame, i.e., four pulses. With this number found to have been reached, the flow comes to the step 154. At the step 154, since the process of winding ½ frame amount of film has been finished, the film feeding motor 35 is stopped from driving to terminate the process of winding the film 20. At the step 155, the first count value is updated to bring the first count value up to "4".

Figure 14:
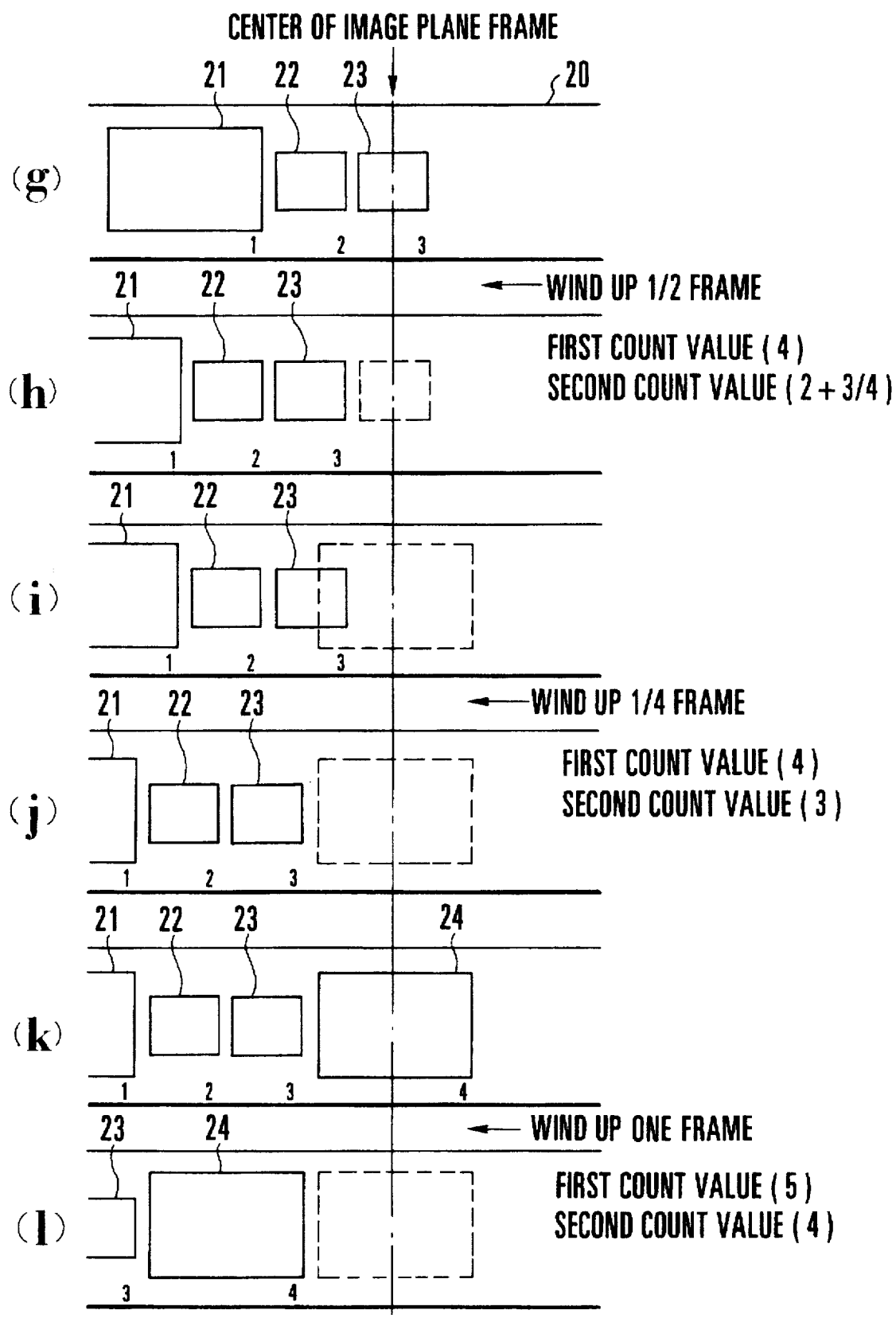
FIG. 14 shows the transitions taking place in the positional relation between the film and the image plane frames continuously from what is shown in FIG. 13.

Through these processes, the positional relation between the film 20 and the image plane frame formed with the light blocking plates 2, 3, 6 and 7 inserted changes from the relation shown at the part (g) of FIG. 14 to a relation shown at part (h) of FIG. 14. At this point in time, the first and second count values obtained by the first and second counters 39 and 42 have become values as shown on the right side of the part (h) of FIG. 14. After that, the flow again comes back to the standby state of the step 101 of FIG. 10. Since the normal mode is selected by the mode change-over switch 32 this time, the flow comes from the step 102 to the step 103.

At the step 103, the electrical contact state of the patterns on the circuit board 15 is checked to find if the image plane frame has been set at the size for the normal mode. Since the size of the image plane frame was set for the spurious telephoto mode last time in this instance, the flow comes to a step 104. At the step 104, the image plane frame change-over motor 11 is driven to cause the contact piece 14 to move along with the cam plate 9. The image plane frame change-over motor 11 is stopped from driving when the patterns 15a and 15c of the circuit board 15 come into electrical contact with each other. The cam plate 9 is thus placed in its lower end position as shown in FIG. 1. Then, since all the light blocking plates 2, 3, 6 and 7 are retracted from the frame 1 by this, as mentioned above, the size of the image plane frame then becomes as defined by the frame 1, and the positional relation of the image plane frame to the film 20 becomes as shown at part (i) of FIG. 14.

At the step 105, the contents of the first counter 39 and the memory 38 are checked, in the same manner as described above, to find if the mode selected last time was the spurious telephoto mode. Since the previous mode was the spurious telephoto mode in this instance, the flow comes to the step 106. At the step 106, the contents of the memory 38 is checked to find whether the last shot was taken by using the left half or the right half of the normal (standard) shooting range. Since the right half was used in this instance, the flow comes to the step 107. At the step 107, the film feeding motor driving circuit 34 causes the film 20 driven by the film feeding motor 35 in the direction of film winding.

At the step 108, the second count value is counted up as much as the number of pulses of the pulse signal input from the film position pulse generating circuit 36. At this time, since the second counter 42 counts two pulses, the second count value becomes "3". At the step 109, a check is made to find if the number of pulses of the pulse signal from the film position pulse generating circuit 36 has reached a number of pulses for ¼ frames, i.e., two pulses. With the pulses found to have reached this number, the flow come to the step 110. At the step 110, since the process of winding ¼ frame amount of the film has been finished, the film feeding motor 35 is stopped from driving and the process of winding the film 20 is terminated.

Therefore, through the processes, the positional relation between the film 20 and the image plane frame defined changes from the state shown at the part (i) of FIG. 14 to a state shown at part (j) of FIG. 14 with the light blocking plates 2, 3, 6 and 7 retracted from their inserted positions. Further, at this point in time, the count value of the second counter 42 becomes as shown on the right side of the part (j) of FIG. 14.

At the step 115, a check is made to find if the release switch which is not shown has been turned on. With the release switch having been turned on, the flow comes to the step 116. At the step 116, the shooting actions such as the focusing and exposure actions of the AE and AF circuits 40 and 41 are carried out. As a result, an exposed frame 24 is formed on the film 20 as shown at part (k) of FIG. 14.

At the step 117, the first count value of the first counter 39, i.e., an exposed frame number "4" indicating a serial number of shooting, is imprinted at the exposed frame 24. At the step 118, the exposed position of the film 20 is stored in the memory 38. The memory 38 then stores the current first and second count values (4) and (3) of the first and second counters 39 and 42 and the fact that the current mode is the normal mode.

At the step 119, the film feeding motor driving circuit 34 is caused to have the film 20 driven in the direction of winding by the film feeding motor 35. At the step 120, the second count value is counted up as much as the number of pulses of the pulse signal inputted from the film position pulse generating circuit 36. Since the second counter 42 then counts eight pulses, the second count value becomes "4". At the step 121, a check is made to find if the number of pulses of the pulse signal from the film position pulse generating circuit 36 has reached a number for one frame, i.e., eight pulses. If so, the flow comes to the step 122. At the step 122, since the process of winding one frame amount of film has been finished, the film feeding motor 35 is stopped from driving to terminate the process of winding the film 20. At the step 123, the first count value is updated to bring it up to "5".

Through these processes, the positional relation between the film 20 and the image plane frame (the frame 1) which is formed with the light blocking plates 2, 3, 6 and 7 retracted changes from the state shown at the part (k) of FIG. 14 to a state shown at part (l) of FIG. 14. Further, in this point of time, the first and second count values of the first and second counters 39 and 42 become as shown on the right side of the part (l) of FIG. 14 as apparent from the description given above.

After that, the flow comes back to the standby state of the step 101. Then, since the panorama mode is selected this time by the mode change-over switch 32, the flow of operation shifts from the step 102 to a step 156 of FIG. 12. At the step 156, the electrical contact state of the patterns of the circuit board 15 is checked to find if the image plane frame has already been set in the size for the panorama mode. Since the image plane frame size was set for the normal mode last time and not for the panorama mode in this instance, the flow comes to a step 157.

At the step 157, the image plane frame change-over motor 11 is driven to move the contact piece 14 along with the cam plate 9. The image plane frame change-over motor 11 is brought to a stop to have the cam plate 9 located in its upper end position as shown in FIG. 2. By this, the protruding part 5c of the interconnecting lever 5 is moved along the cam slot 9a to the right end of the cam slot 9a. Therefore, the interconnecting lever 5 remains in a position to which it has been turned round clockwise. The light blocking plates 2 and 3 are thus held in their positions of being inserted into the inside of the frame 1. Further, the protruding part 8a of the slide lever 8 moves along the cam slot 9b. Since the slide lever 8 thus moves to its right end position as shown in FIG. 7, the light blocking plates 6 and 7 are held in their retracted positions away from the frame 1. As a result, the shooting image plane is obtained within a range defined by the light blocking plates 2 and 3. The state of the image plane frame thus obtained is shown at part (m) in FIG. 15.

At a step 158, the contents of the first counter 39 and the memory 38 are checked to find if the mode last selected was the spurious telephoto mode. Since the mode last selected was the normal mode in this case, the flow comes to a step 164. At the step 164, a check is made to find if the release switch (not shown) has been turned on. Then, with the release switch assumed to have been turned on, the flow comes to a step 165. At the step 165, the shooting actions such as the focusing and exposure actions of the AE and AF circuits 40 and 41 are carried out. As a result, an exposed frame 25 is formed on the film 20 as shown at part (n) of FIG. 15.

Figure 15:
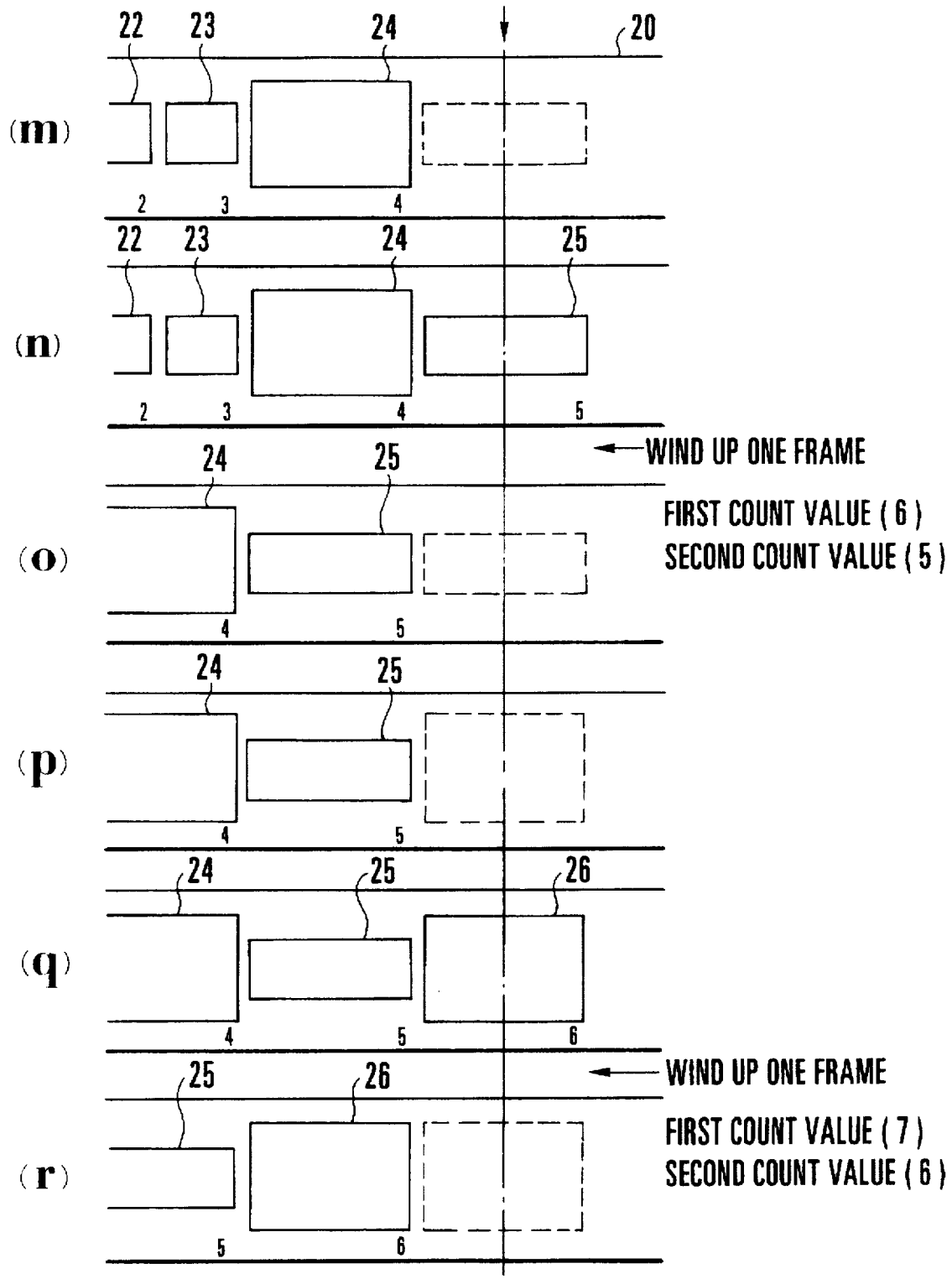
FIG. 15 shows the transitions taking place in the positional relation between the film and the image plane frames continuously from what is shown in FIG. 14.

At a step 166, the first count value of the first counter 39, i.e., an exposed frame number "5" which is a serial number of shooting, is imprinted at the exposed frame 25 as shown at the part (n) of FIG. 15. At a step 167, the exposed position of the film 20 is stored in the memory 38. The memory 38 then stores the current first and second count values (5) and (4) of the first and second counters 39 and 42 and the fact that the mode currently selected is the panorama mode.

At a step 168, the film feeding motor driving circuit 34 causes the film 20 driven in the direction of winding by the film feeding motor 35. At a step 169, the second count value is counted up as much as the number of pulses of the pulse signal inputted from the film position pulse generating circuit 36. At this time, since the second counter 42 counts eight pulses, the second count value is carried up one place. The second count value thus becomes "5".

At a step 170, a check is made to find if the number of pulses of the pulse signal from the film position pulse generating circuit 36 has reached a number for one frame, i.e., eight pulses. With the pulses found to have reached this number, the flow comes to a step 171. At the step 171, since the process of winding one frame amount of film has been finished, the film feeding motor 35 is stopped from driving to terminate the process of winding the film 20. At a step 172, the first count value is updated to bring it up to "6".

The positional relation between the film 20 and the image plane frame currently formed by the light blocking plates 2 and 6 changes from the state shown at the part (n) of FIG. 15 to a state shown at part (o) of FIG. 15. At this point of time, the first and second count values of the first and second counters 39 and 42 are as shown on the right side of the part (o) of FIG. 15 as apparent from the description given above.

After that, the flow comes back to the standby state of the step 101 of FIG. 10. Since the normal mode is selected by the mode change-over switch 32 this time, the flow shifts from the step 102 to the step 103.

At the step 103, the electrical contact state of the patterns on the circuit board 15 is checked to find if the image plane frame has already been set in the size for the normal mode. Since the size of the image plane frame was set for the panorama mode last time, the flow comes to the step 104. At the step 104, the image plane frame change-over motor 11 is driven to move the contact piece 14 along with the cam plate 9. The image plane frame change-over motor 11 is brought to a stop when the patterns 15a and 15c on the circuit board 15 come into electrical contact with each other. The cam plate 9 is thus brought to its lower end position as shown in FIG. 1. As a result, all the light blocking plates 2, 3, 6 and 7 are retracted away from the frame 1 as mentioned above. Therefore, the image plane frame is set in the size defined by the frame 1. The positional relation thus obtained between the film 20 and the image plane frame then becomes as shown at part (p) of FIG. 15.

At the step 105, the contents of the first counter 39 and the memory 38 are checked to find if the mode selected last was the spurious telephoto mode. Since the mode selected last was the panorama mode in this case, the flow comes to the step 115. At the step 115, a check is made to find if the release switch (not shown) has been turned on. With the release switch assumed to have been turned on, the flow comes to the step 116. At the step 116, the shooting actions such as the focusing and exposure actions of the AE and AF circuits 40 and 41 are carried out.

As a result, an exposed frame 26 is formed on the film 20 as shown at part (q) of FIG. 15. At the step 117, the first count value obtained at the first counter 39, i.e., an exposed frame number "6" which is a serial number of shooting is imprinted at the exposed frame 26 as shown at the part (q) of FIG. 15.

At the step 118, the exposed position of the film 20 is stored in the memory 38. The memory 38 stores the current first and second count values (6) and (5) of the first and second counters 39 and 42 and the fact that the current mode is the normal mode. At the step 119, the film feeding motor driving circuit 34 causes the film 20 driven in the winding direction by the film feeding motor 35. At the step 120, the second count value is counted up as much as the number of pulses of the pulse signal inputted from the film position pulse generating circuit 36. Further, since the second counter 42 counts eight pulses at this time, the second count value is carried up to bring its value up to "6".

At the step 121, a check is made to find if the number of pulses of the pulse signal from the film position pulse generating circuit 36 has reached a number for one frame, i.e., eight pulses. With the number found to have been reached, the flow comes to the step 122. At the step 122, since the process of winding one frame amount of film has been finished, the film feeding motor 35 is stopped from driving to terminate the process of winding the film 20. At the step 123, the first count value is updated to bring it up to "7".

Through these processes, the positional relation between the film 20 and the image plane frame formed with all the light blocking plates 2, 3, 6 and 7 retracted (the frame 1) changes from the state shown at the part (q) to a state as shown at part (r) of FIG. 15. Further, the first and second count values obtained by the first and second counters 39 and 42 at this point of time are as shown on the right side of the part (r) of FIG. 15, as apparent from the description given above.

After that, the flow again comes back to the standby state of the step 101 of FIG. 10. Since the spurious telephoto mode is selected by the mode change-over switch 32 this time, the flow shifts from the step 102 to the step 124 of FIG. 11.

At the step 124, the contents of the first counter 39 and the memory 38 are checked, in the same manner as the preceding round of flow, to find if the mode last selected was the spurious telephoto mode. Since the mode selected last time was the normal mode in this case, the flow comes to the step 125. At the step 125, the electrical contact state of the patterns on the circuit board 15 is checked to find if the image plane frame has already been set in the size for the spurious telephoto mode. Since the image plane frame has been set in the size for the normal mode in this instance, the flow comes to the step 126. At the step 126, the image plane frame change-over motor 11 is driven to move the contact piece 14 along with the cam plate 9. The image plane frame change-over motor 11 is brought to a stop when the patterns 15a, 15b and 15c of the circuit board 15 come into electrical contact with each other. The cam plate 9 is thus set in an intermediate position between its upper and lower end positions as shown in FIG. 3.

As a result, as mentioned in the foregoing, all the light blocking plates 2, 3, 6 and 7 are inserted into the frame 1. Therefore, the image plane frame comes to be in a size defined by the light blocking plates 2, 3, 6 and 7. The image plane frame size thus becomes one half of the normal image plane frame size. In other words, the image plane frame changes from the state shown at the part (r) of FIG. 15 to a state shown at part (s) of FIG. 16. At the step 127, a search is made for an unexposed frame located before the film position for the current image plane frame (in the film rewinding direction). There is no unexposed part in this case. At the step 128, the number N of frames to be rewound up to a frame located before an unexposed frame is computed. However, since there is no unexposed part in this case, the number N is set at zero.

At the step 129, a check is made to find if the number N of rewound frames is larger than a predetermined value (5) or if the number N is at zero. Since the number N is zero in this case, the flow comes to the step 143. At the step 143, the film feeding motor driving circuit 34 is caused to have the film 20 driven in the rewinding direction by the film feeding motor 35. At the step 144, the second count value is counted down as much as the number of pulses of the pulse signal inputted from the film position pulse generating circuit 36. At this time, since the second counter 42 counts two pulses, the second count value becomes "5+¾".

At the step 145, a check is made to find if the number of pulses of the pulse signal from the film position pulse generating circuit 36 has reached a number for ¼ frame, i.e., two pulses. With the number found to have been reached, the flow comes to the step 146. At the step 146, since the process of rewinding ¼ frame amount of film has been finished, the film feeding motor 35 is stopped from driving to terminate the process of rewinding the film 20.

Figure 16:
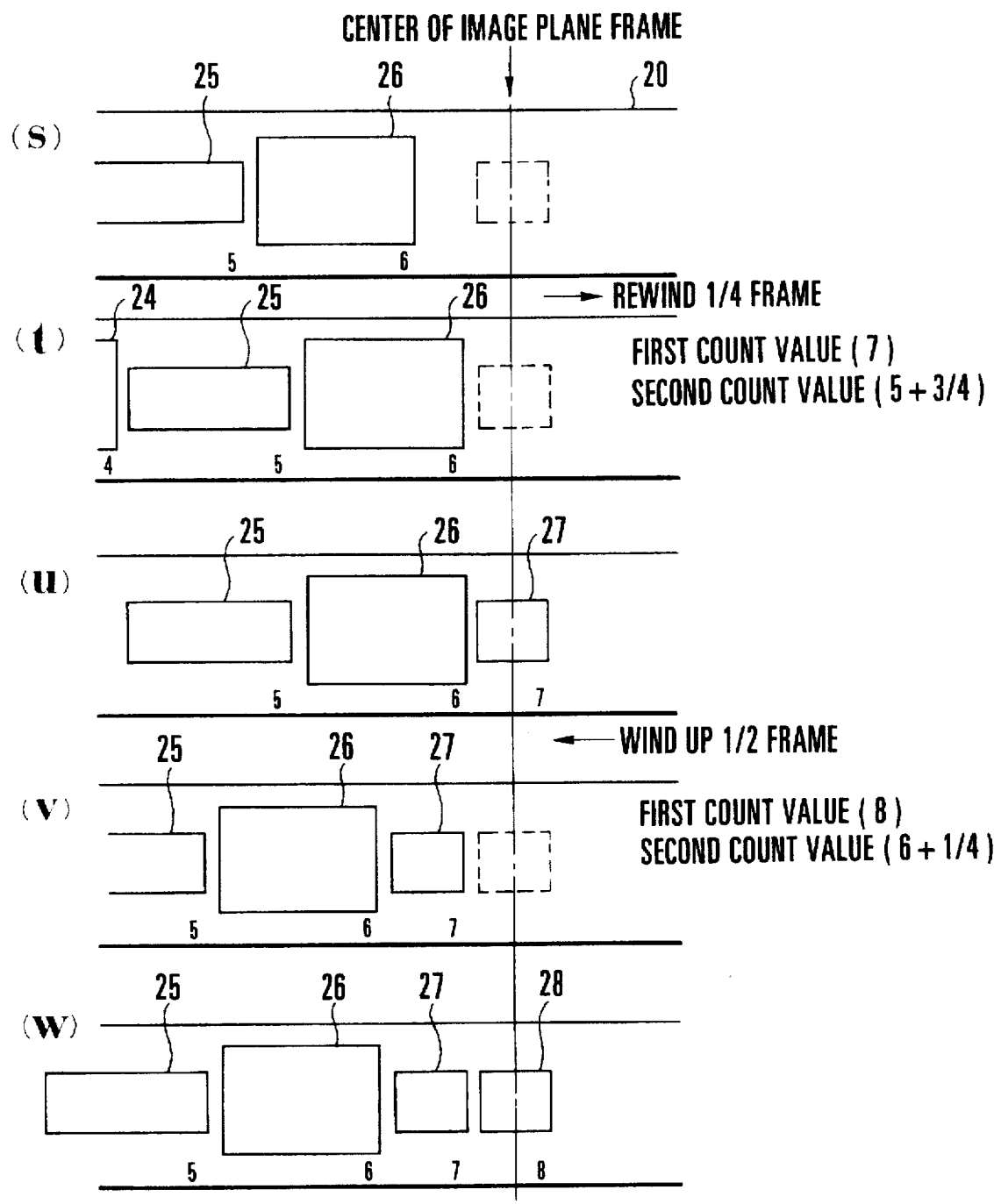
FIG. 16 shows the transitions taking place in the positional relation between the film and the image plane frames continuously from what is shown in FIG. 15.

Through these processes, the positional relation between the film 20 and the current image plane frame which is defined by the light blocking plates 2, 3, 6 and 7 changes from the state shown at the part (s) of FIG. 16 to a state shown at part (t) of FIG. 16. The second count value obtained at this point of time by the second counter 39 has been changed to a value as shown on the right side of the part (t) of FIG. 16. At the step 147, a check is made to find if the release switch (not shown) has been turned on. With the release switch assumed to have been turned on, the flow comes to the step 148.

At the step 148, shooting actions such as the focusing and exposure actions of the AE and AF circuits 40 and 41 are carried out. As a result, an exposed frame 27 is formed on the film 20 as shown at part (u) of FIG. 16. At the step 149, for this exposed frame 27, the first count value of the first counter 39, i.e., an exposed frame number "7" indicating a serial number of shooting, is imprinted at the exposed frame 27 as shown at the part (u) of FIG. 16. At the step 150, the exposed position of the film 20 is stored in the memory 38. The memory then stores the current first and second count values (7) and (5+¾) of the first and second counters 39 and 42, the fact that the current mode is the spurious telephoto mode and the fact that a shot is taken using the left half of the image plane frame.

At the step 151, the film feeding motor driving circuit 34 is caused to have the film 20 driven in the winding direction by the film feeding motor 35. At the step 152, the second count value is counted up as much as the number of pulses of the pulse signal inputted from the film position pulse generating circuit 36. At this time, since the second counter 42 counts four pulses, the second count value becomes "6+¼". At the step 153, a check is made to find if the number of pulses of the pulse signal from the film position pulse generating circuit has reached a number for ½ frame amount of the film, i.e., four pulses. With the pulses found to have reached this number, the flow comes to the step 154. At the step 154, since the process of winding ½ frame amount of film has been finished, the film feeding motor 35 is stopped from driving to terminate the process of winding the film 20. At the step 155, the first count value is updated to bring it up to "8".

Through these processes, the positional relation between the film 20 and the image plane frame currently formed with the light blocking plates 2, 3, 6 and 7 inserted changes from the state shown at the part (u) of FIG. 16 to a state shown at part (v) of FIG. 16. The first and second count values obtained by the first and second counters 39 and 42 at this point of time becomes as shown on the right side of the part (v) of FIG. 16 as apparent from the description given above.

After that, the flow again comes back to the standby state of the step 101 of FIG. 10. Since the spurious telephoto mode is again selected by the mode change-over switch 32 also this time, the flow shifts again from the step 102 to the step 124 of FIG. 11.

At the step 124, a check is made to find if the mode last selected was the spurious telephoto mode. Since it was so in this case, the flow comes to the step 147 of FIG. 11. At the step 147, a check is made to find if the release switch (not shown) has been turned on. With the release switch assumed to have been turned on, the flow comes to the step 148. At the step 148, the shooting actions such as the automatic focusing and exposure actions of the AE and AF circuits 40 and 41 are carried out. As a result, an exposed frame 28 is formed on the film 20 as shown at part (w) of FIG. 16. At a step 149, the first count value of the fist counter 39, i.e., an exposed frame number "8" which is a serial number of shooting, is imprinted at the exposed frame 28 as shown at the part (w) of FIG. 16.

At the step 150, the exposed position of the film 20 is stored in the memory 38. The memory 38 then stores the current first and second count values (8) and (6+¼) of the first and second counters 39 and 42, the fact that the current mode is the spurious telephoto mode and the fact that a shot has been taken using the right half of the image plane frame. At the step 151, the film feeding motor driving circuit 34 is caused to have the film 20 driven in the winding direction by the film feeding motor 35.

At the step 152, the second count value is counted up as much as the number of pulses of the pulse signal inputted from the film position pulse generating circuit 36. At the step 153, a check is made to find if the number of pulses has reached a number for ½ frame, i.e., four pulses. With this number found to have been reached, the flow comes to the step 154. At the step 154, since the process of winding ½ frame amount of film has been finished, the film feeding motor 35 is stopped from driving to terminate the process of winding the film 20. At the step 155, the first count value is updated to bring it up to "9". After that, the flow again goes back to the standby state of the step 101 of FIG. 10.

In a case where the exposed frame 24 which is as shown in FIG. 8 is to be formed after shots are taken to form the exposed frames 21 and 22, without forming the exposed frame 23, the embodiment operates as follows:

After completion of shooting for the exposed frame 22, the mode becomes the normal mode. Therefore, the flow of operation goes back to the step 101 in the same manner as the operation described in the foregoing. The flow then proceeds in the order of the steps 101–102–103–104–105. At the step 105, the contents of the film counter 39 and the memory 38 are checked, in the same manner as described in the foregoing, to find that the mode last selected was the spurious telephoto mode. The flow, therefore, comes to the next step 106 to make a check to find which side of the left and right halves of the normal shooting range has previously been used in the spurious telephoto mode. However, since it is the left half of the normal shooting range in this instance, the flow comes to the step 111.

At the step 111, the film feeding motor driving circuit 34 is caused to have the film 20 driven in the film winding direction by the film feeding motor 35. At the step 112, the second count value is counted up as much as the number of pulses of the pulse signal inputted from the film position pulse generating circuit 36. At this time, since the second counter 42 counts six pulses, the second count value becomes "3". At the step 113, a check is made to find if the number of pulses of the pulse signal from the film position pulse generating circuit 36 has reached a number for ¾ frame, i.e., six pulses. With the number of pulses found to have reached this number, the flow comes to the step 114. At the step 114, since the process of winding ¾ frame amount of film has been finished, the film feeding motor 35 is stopped from driving to terminate the process of winding the film 20.

Through these processes, taking a shot in the normal mode for a next frame becomes possible. Therefore, the film 20 is positioned for this shot. After that, the flow comes to the step 115. Since the processes to be executed at the step 115 and steps subsequent to it are the same as those described in the foregoing, these actions are omitted from the following description.

Figure 12:
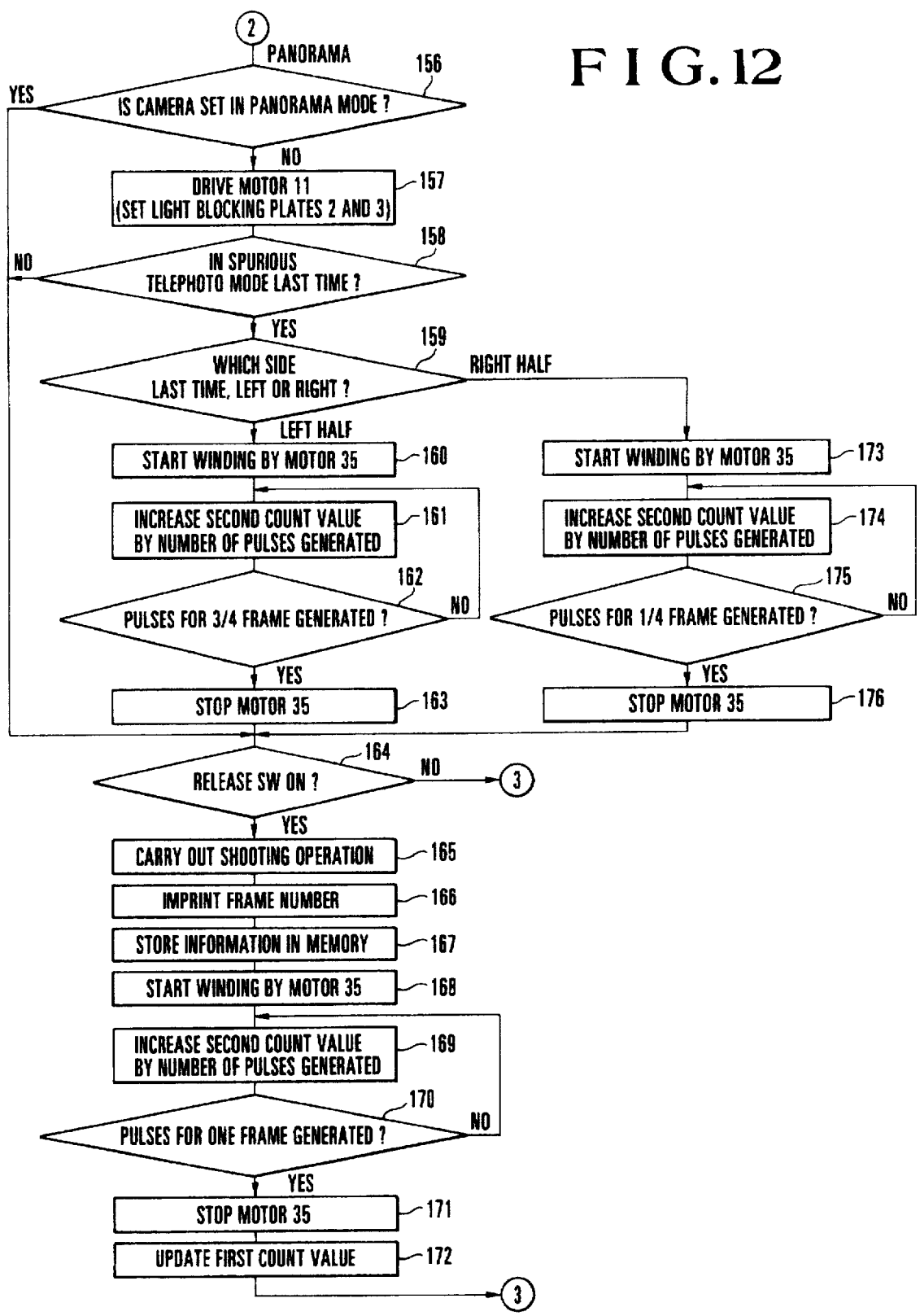
FIG. 12 is a flow chart showing the actions continuing from what is shown in FIG. 10.

Next, again referring to FIG. 8, in a case where shooting has been performed in the spurious telephoto mode prior to taking a shot for forming the exposed frame 25, the embodiment operates as described below:

In this case, after the image plane frame is set as shown in FIG. 2 by the step 157 of FIG. 12, the flow of operation comes to the step 158 to make a check to find if the mode last selected was the spurious telephoto mode. Since it was the spurious telephoto mode, the flow comes from the step 158 to the step 159. At the step 159, the contents of the memory 38 are checked to find which of the left and right halves of the normal shooting range has been used in the spurious telephoto mode. If it is the left half, the flow comes to the step 160. If it is the right half, the flow comes to a step 173.

At the step 160, the film feeding motor driving circuit 34 causes the film 20 driven in the winding direction by the film feeding motor 35. At the step 161, the second count value is counted up as much as the number of pulses of the pulse signal inputted from the film position pulse generating circuit 36. At this time, since the second counter counts upward to increment the second count value by six pulses. At the step 162, a check is made to find if the number of pulses of the pulse signal from the film position pulse generating circuit 36 has reached for a number for ¾ frame, i.e., six pulses. With the number of pulses found to have reached this number, the flow comes to the step 163. At the step 163, since the process of winding ¾ frame amount of the film has been finished, the film feeding motor 35 is stopped from driving to terminate the process of winding the film 20.

Through these processes, the film 20 is set in such a position that permits taking a shot for a frame to be located next to the exposed frame previously formed using the left half of the normal shooting range.

If the previous shot in the spurious telephoto mode is found to have been taken by using the right half of the normal shooting range, instead of the left half, the flow comes to the step 173 as mentioned above.

At the step 173, the film feeding motor driving circuit 34 is caused to have the film 20 driven in the film winding direction by the film feeding motor 35. At a step 174, the second count value is counted up as much as the number of pulses of the pulse signal inputted from the film position pulse generating circuit 36. At that time, the second counter 42 increments the second count value by the number of pulses counted. At a step 175, a check is made to find if the number of pulses of the pulse signal from the film position pulse generating circuit 36 has reached a number for ¼ frame, i.e., two pulses. With the number of pulses found to have reached this number, the flow comes to a step 176. At the step 176, since the process of winding ¼ frame amount of film has been finished, the film feeding motor 35 is stopped from driving to terminate thereby the process of winding the film 20.

Through these processes, the film 20 is set in such a position that permits taking a shot for a frame to be located next to the exposed frame covering the right half of the normal shooting range.

After that, the flow proceeds to the step 164 in either cases. Since the processes to be executed at the step 164 and the steps subsequent to it are the same as what has been described in the foregoing. These steps are, therefore, omitted from the following description.

FIG. 17 shows a case wherein a shot is taken in the normal mode to give an exposed frame 51, another shot is taken in the spurious telephoto mode by using the left half of the normal shooting range to give an exposed frame 52, three shots are taken consecutively in the normal mode to give exposed frames 53, 54 and 55, and, after the three consecutive normal shots, a next shot is to be taken in the spurious telephoto mode. Under this condition, the embodiment operates as follows: The second count value for the exposed frame 52 is stored as "1+¾" in the memory 38. In this case, the positional relation between the film 20 and the image plane frame (=the frame 1) is in a state as shown at a part (a) of FIG. 18. At this time, both the first and second count values obtained within the first and second counters 39 and 42 are "6" as shown on the right side of the part (a) of FIG. 18.

When the spurious telephoto mode is selected by the mode change-over switch 32 under this condition, the flow of operation of the embodiment shifts in the order of the steps 101–102–124.

At the step 124, like in the case described in the foregoing, the contents of the first counter 39 and the memory 38 are checked to find if the mode last selected was the spurious telephoto mode. Since it was the normal mode in this case, the flow of operation comes to the step 125. At the step 125, the electrical contact state of the patterns on the circuit board 15 is checked to find if the image plane frame has already been set in the size for the spurious telephoto mode. Since, the image plane frame has been in the size for the normal mode in this case, the flow comes to the step 126. At the step 126, the image plane frame change-over motor 11 is driven, in the same manner as described in the foregoing, to move the cam plate 9 to its intermediate position between the upper and lower positions as shown in FIG. 3.

Figure 18:
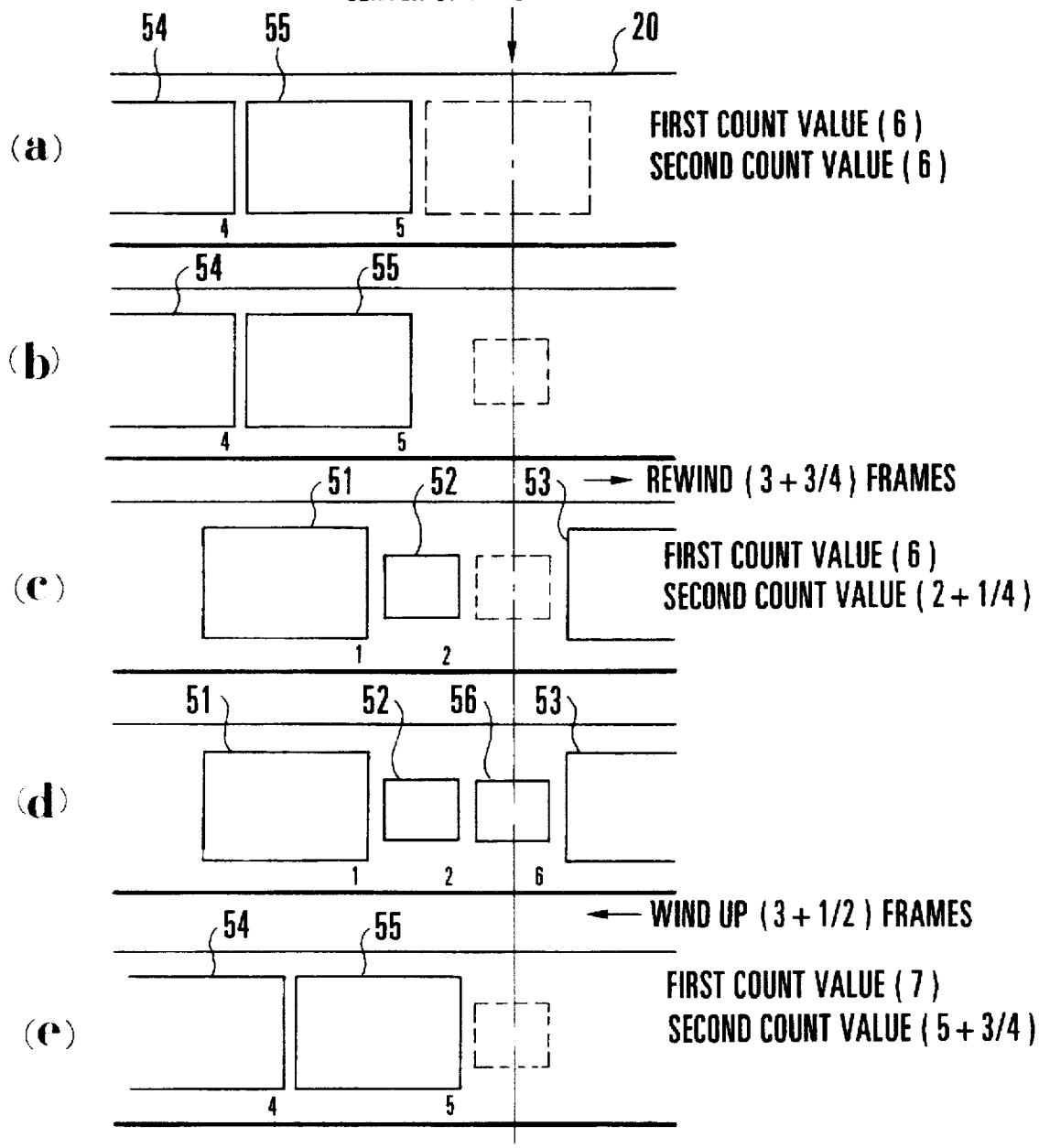
FIG. 18 shows transitions taking place in a positional relation between a film and image plane frames when shots are taken in different modes in the order of FIG. 17 with a value "N" set at a value equal to or less than a predetermined value.

Through these processes, all the light blocking plates 2, 3, 6 and 7 are inserted into the frame 1 as mentioned in the foregoing. The image plane frame is thus set in the size defined by the light blocking plates 2, 3, 6 and 7. In other words, the image plane frame which is shown at the part (a) of FIG. 18 is changed over to a size as indicated by a broken line at part (b) of FIG. 18. At the step 127, the memory 38 is searched for an unexposed frame located before the film position of the current image plane frame (in the film rewinding direction).

At the step 128, the number N of frames to be rewound up to a frame located before the unexposed frame is obtained by computation. The number N is obtained from a difference between the second count value which corresponds to the above-stated exposed frame 52 and is stored in the memory 38 and the second count value which is currently obtained within the second counter 42. In this case, therefore, the number N is obtained from "6−(1+¾)" as "N=4+¼".

At the step 129, a check is made to find if the number N of rewound frames obtained by the step 128 is larger than a predetermined value (5) or the number N is zero (N=0).

Since the result of computation is "N=4+ ¼" as mentioned above in this case, the flow comes to the step 130. At the step 130, the film feeding motor driving circuit 34 causes the film 20 driven in the rewinding direction by the film feeding motor 35. At the step 131, the second count value is counted down as much as the number of pulses of the pulse signal input from the film position pulse generating circuit 36. At this time, since the second counter 42 counts a number of pulses corresponding to "3+¾" frame amount of film, the second count value becomes "2+¼".

At the step 132, a check is made to find if the number of pulses of the pulse signal from the film position pulse generating circuit 36 has reached a number for "N−(½)" frame, i.e., "3+¾" frame amount of film. With the number of pulses found to have reached this number, the flow comes to the step 133. At the step 133, since the process of rewinding "3+¾" frame amount of film has been finished, the film feeding motor 35 is stopped from driving to terminate the process of rewinding the film 20. Therefore, through these processes, the state of the part (b) of FIG. 18 changes to a state shown at part (c) of FIG. 18. At this point of time, the second count value obtained at the second counter 42 has become as shown on the right side of the part (c) of FIG. 18, as apparent from the description given above.

Figure 11:
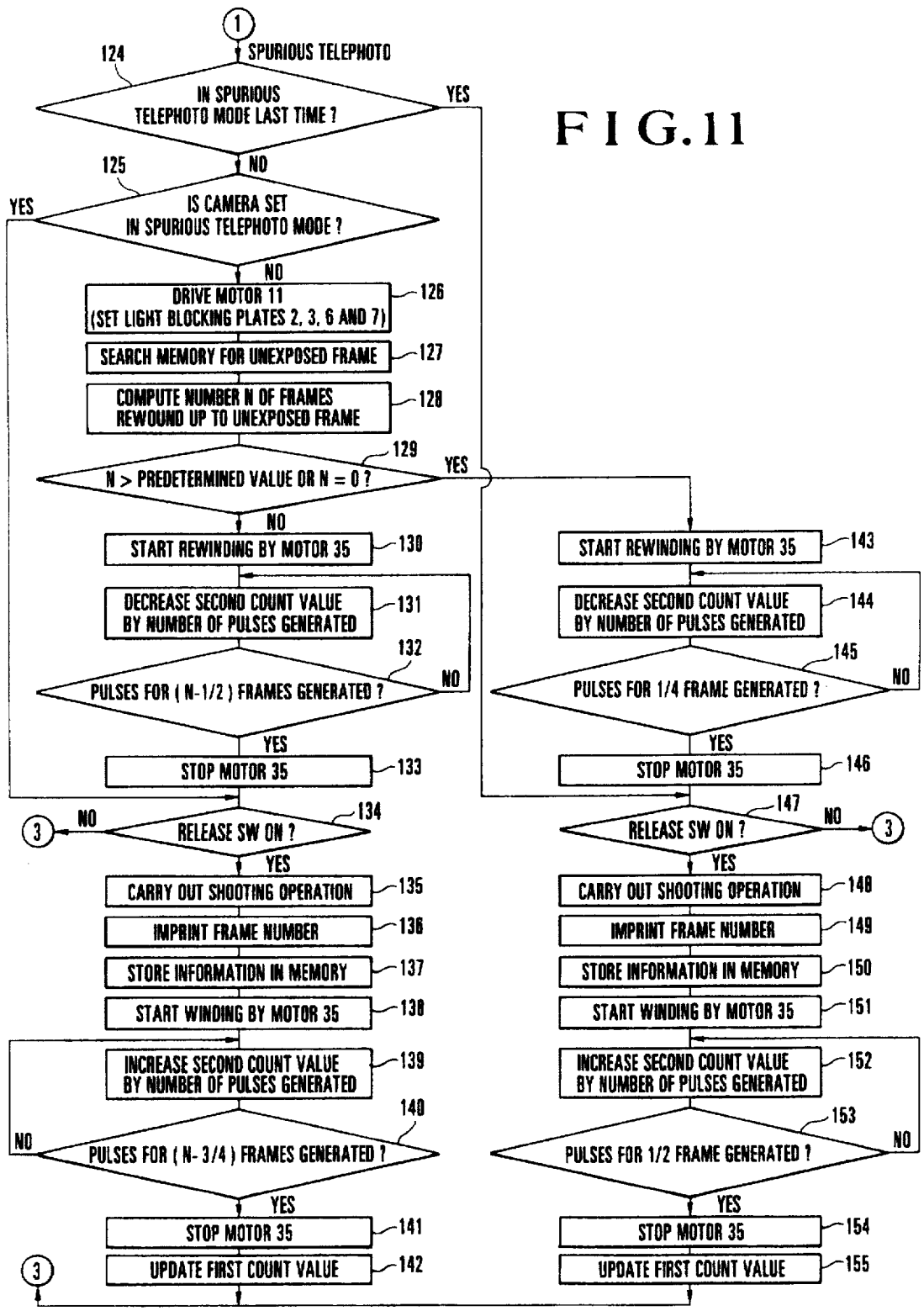
FIG. 11 is a flow chart showing the actions continuing from what is shown in FIG. 10.

After the step 133, the flow comes to the step 134 of FIG. 11. At the step 134, a check is made to find if the release switch (not shown) has been turned on. With the release switch assumed to have been turned on, the flow comes to the step 135. At the step 135, the shooting actions such as the focusing and exposure actions of the AE and AF circuits 40 and 41 are carried out in a known manner. As a result, the exposed frame 56 is formed on the film 20 as shown at part (d) of FIG. 18.

At the step 136, the first count value of the first counter 39, i.e., an exposed frame number "6" which is a serial number of shooting, is imprinted at the exposed frame 56 as shown at the part (d) of FIG. 18. At the step 137, the exposed position of the film 20 is stored in the memory 38. The memory 38 then stores the first and second count values (6) and (2+¼) which are obtained with the pulses counted down according to the film rewinding process by the first and second counters 39 and 42, the fact that the current mode is the spurious telephoto mode and the fact that the right half of the normal shooting range is used for a shot taken in the spurious telephoto mode.

At the step 138, the film feeding motor driving circuit 34 is caused to have the film 20 driven in the winding direction by the film feeding motor 35. At the step 139, the second count value is counted up as much as the number of pulses of the pulse signal inputted from the film position pulse generating circuit 36. At this time, since the second counter counts a number of pulses which corresponds to (3+½) frame, the second count value becomes "5+¾". At the step 140, a check is made to find if the number of pulses of the pulse signal from the film position pulse generating circuit 36 has reached a number of pulses for "N−(¾)" frame, i.e., (3+½) frame in this case. With the number of pulses found to have reached this number, the flow comes to the step 141.

At the step 141, since the process of winding (3+½) frame amount of film has been finished, the film feeding motor 35 is stopped from driving to terminate the processing of winding the film 20. At the step 142, the first count value is updated to bring it up to "7".

Through these processes, the positional relation between the film 20 and the image plane frame currently formed with the light blocking plates 2, 3, 6 and 7 inserted changes from the state shown at the part (d) of FIG. 18 to a state shown at part (e) of FIG. 18. At this point of time, the first and second count values in the first and second counters 39 and 42 are as shown on the right side of the part (e) of FIG. 18.

Next, the following describes the operation of the embodiment to be performed under a condition as shown in FIG. 19. In this case, a shot is first taken in the normal mode to give an exposed frame 51. A next shot is taken in the spurious telephoto mode by using the left half of the normal shooting range to give an exposed frame 52. Further, eight shots are taken consecutively in the normal mode to give exposed frames 53 to 60. After that, a next shot is to be taken in the spurious telephoto mode.

In this case, the positional relation between the film 20 and the image plane frame (=the frame 1) is in a state as shown at part (a) of FIG. 20. At this point of time, the first and second count values of the first and second counters 39 and 42 are respectively "11" as shown on the right side of the part (a) of FIG. 20.

Under this condition, when the spurious telephoto mode is selected by the mode change-over switch 32, the flow of operation shifts in the order of steps 101–102–124. At the step 124, the contents of the first counter 39 and the memory 38 are checked to find if the mode last selected was the spurious telephoto mode. Since it was the normal mode in this case, the flow comes to the step 125. At the step 125, the electrical contact state of the patterns on the circuit board 15 is checked to find if the image plane frame has already been set in the size for the spurious telephoto mode. Since the image plane frame has been in the size for the normal mode in this case, the flow comes to the step 126. At the step 126, the image plane frame change-over motor 11 is driven, in the same manner as described in the foregoing, to bring the cam plate 9 to its intermediate position between the upper and lower end positions as shown in FIG. 3. This causes the light blocking plates 2, 3, 6 and 7 to enter into the frame 1 to give the image plane frame size defined jointly by the light blocking plate 2, 3, 6 and 7. Thus, the image plane frame which is shown at the part (a) of FIG. 20 is changed over to a size as indicated by a broken line at part (b) of FIG. 20.

At the step 127, the memory 38 is searched for an unexposed frame located before (in the film rewinding direction) the current image plane frame. At the step 128, the number N of frames to be rewound up to the unexposed frame is computed. The number N of rewound frames is obtained from a difference between the second count value which corresponds to the exposed frame 52 and stored in the memory 38 and the second count value which currently exists at the second counter 42, in the same manner as described in the foregoing. In this case, "N=9+¼" is obtained from "11–(1+¾)".

At the step 129, a check is made to find if the number N of rewound frames obtained by the step 128 is larger than a predetermined value (5) or the number N is zero. Since the number N is "N=9+¼" in this case, the flow shifts to the step 143. At the step 143, the film feeding motor driving circuit 34 causes the film 20 driven in the rewinding direction by the film feeding motor 35. At the step 144, the second count value is counted down as much as the number of pulses of the pulse signal inputted from the film position pulse generating circuit 36. At this time, since the second counter 42 counts two pulses, the second count value becomes "10+¾". At the step 145, a check is made to find if the number of pulses of the pulse signal from the film position pulse generating circuit 36 has reached a number of pulse for ¼ frame, i.e., two pulses. With the number of pulses found to have reached this number, the flow comes to the step 146. At the step 146, since the process of rewinding ¼ frame amount of film has been finished, the film feeding motor 35 is stopped from driving to terminate the process of rewinding the film 20.

Through these processes, the positional relation between the film 20 and the image plane frame defined by the light blocking plates 2, 3, 6 and 7 changes from the state shown at the part (b) of FIG. 20 to a state shown at part (c) of FIG. 20. The flow then comes to the step 147. At the step 147, a check is made to find if the release switch (not shown) has been turned on. With the release switch assumed to have been turned on, the flow comes to the step 148. At the step 148, known shooting actions such as the focusing and exposure actions of the AE and AF circuits 40 and 41 are carried out.

As a result, an exposed frame 61 is formed on the film 20 in a manner as shown at part (d) of FIG. 20. At the step 149, the first count value of the first counter 39, i.e., an exposed frame number "11" which is a serial number of shooting, is imprinted at the above-stated exposed frame 61 as shown at the part (d) of FIG. 20. At the step 150, the exposed position of the film 20 is stored in the memory 38. In this instance, the memory 38 stores the first and second count values (11) and (11) of the first and second counters 39 and 42, the fact that the current mode is the spurious telephoto mode and the fact that the shot is taken using the left half of the shooting range.

At the step 151, the film feeding motor driving circuit 34 is caused to have the film 20 driven in the winding direction by the film feeding motor 35. At the step 152, the second count value is counted up as much as the number of pulses of the pulse signal inputted from the film position pulse generating circuit 36. At this time, since the second counter 42 counts four pulses, the second count value becomes "11+¼". At the step 153, a check is made to find if the number of pulses of the pulse signal from the film position pulse generating circuit 36 has reached a number of pulses for ½ frame, i.e., four pulses. With the number of pulses found to have reached this number, the flow comes to the step 154.

At the step 154, since the process of winding ½ frame amount of film has been finished, the film feeding motor 35 is stopped from driving to terminate the process of winding the film 20. At the step 155, the first count value is updated to bring it up to "12".

Through these processes, the positional relation between the film 20 and the image plane frame formed with the light blocking plates 2, 3, 6 and 7 inserted changes from the state of the part (d) of FIG. 20 to a state shown at part (e) of FIG. 20. At this point of time, the first and second count values of the first and second counters 39 and 42 have become as shown on the right side of the part (e) of FIG. 20 and as apparent from the description given above.

In cases where there is obtained a relation in which the number N of rewound frames is larger than a predetermined value, like in the case described above, a spurious telephoto shot is taken on a next frame without rewinding the film to an unexposed frame position, because the process of rewinding the film up to an unexposed frame takes a considerably long period of time, which might cause the camera operator to miss a shutter opportunity.

In the case of this embodiment, the above-stated predetermined value is set at "5 frames". However, this value is varied according to the nature of the camera. This value may be set at a smaller value if the camera is designed to attach importance to the shutter opportunity or may be set at a larger value if the camera is designed to attach importance to economization. Further, if so desired, the predetermined value may be set at "36 frames" or more to cover all frames without fail.

With the camera arranged as described in the foregoing, when a shot or shots are taken in the spurious telephoto mode, the frames of the spurious telephoto shots can be printed by utilizing panorama printing arrangement, with two of these frames printed on one and the same oblong sheet of printing paper. Spurious telephoto prints are thus obtained as a panorama print by applying a mask of the panorama size in printing. Therefore, while borders between the exposed parts and the peripheral parts clearly show on the sides defined by this mask, the border parts of the two adjacent frames of the spurious telephoto shots might be in a blurred state on the side of the boundary between them as the boundary between the exposed and unexposed parts of the film is printed as it is without applying any mask.

More specifically, referring to FIG. 8, the upper sides 22b and 23b and the lower sides 22c and 23c of the exposed frames 22 and 23 are somewhat eclipsed by the mask in printing. Therefore, even if these sides are somewhat blurred on the film 20, they show sharp border parts when printed. However, the right side 22a of the exposed frame 22 and the left side 23a of the exposed frame 23 are, on the other hand, printed in the same state as obtained on the film 20 without being eclipsed by any mask.

To solve this problem, this embodiment is arranged as follows: Referring to FIG. 5, the edges 6c and 7c of the light blocking plates 6 and 7 which define respectively the right and left sides of a photo-taking light flux 13 coming from the photo taking lens 12 to the film 20 are arranged to be located closer to the film 20 than a distance between the film 20 and each of the light blocking plates 2 and 3 which define the upper and lower sides of the light flux 13. The arrangement enables the right and left side borders of the frame to be sharply formed on the film 20 and to clearly show the borders on all the upper, lower, right and left sides in printing.

The embodiment is arranged to permit taking spurious telephoto shots of two magnifications within the image plane of the conventional panorama size. This arrangement enables photofinishing laboratories to carry out developing and printing processes on the frames formed by spurious telephoto shots by utilizing the existing panorama printing facilities. Therefore, the camera having the spurious telephoto shooting function can be operated by taking advantage of this function. It is another advantage of the embodiment that two spurious telephoto shots of two magnifications can be taken within one and the same image plane of the panorama size, so that the film can be prevented from being wasted.

In a case where a number of shots not exceeding a predetermined number are taken consecutively in a mode other than the spurious telephoto mode after a shot is taken in the spurious telephoto mode by using only the left or right half of the normal shooting range and, after that, the spurious telephoto mode is again selected, the embodiment rewinds the film to the position of the remaining right or left half of the normal shooting range to permit taking another spurious telephoto shot using the remaining half. However, if the number of the shots taken consecutively in a mode other than the spurious telephoto mode exceeds the predetermined number, the embodiment allows the spurious telephoto shot to be taken by using the left or right half of a new normal shooting range of frame, so that the camera operator can be saved from missing a valuable shutter opportunity.

Further, the embodiment is arranged to imprint a serial number of shooting at each exposed frame. Even if shots are taken in various shooting modes including the spurious telephoto mode in a randomly commingled state, therefore, the order of shooting can be found without difficulty by virtue of the arrangement.

The light blocking plates 6 and 7 which define the positions of the right and left sides of the image plane frame to be used in the spurious telephoto mode are arranged to have their edges 6c and 7c located closer to the film 20 than the light blocking plates 2 and 3 which define the positions of the upper and lower sides of the image plane frame, so that spurious telephoto shots can be printed in a state of clearly showing their upper, lower, right and left borders.

As described in the foregoing, the embodiment of this invention is provided with image plane frame change-over means for switching the size of the image plane frame between the size of the normal image plane frame and the size of the spurious telephoto image plane frame which is not exceeding one half of the size of the normal image plane, and restricting means for placing a picture taken by the spurious telephoto image plane frame within the panorama picture shooting range of the film. The arrangement is such that, in the spurious telephoto mode, each spurious telephoto shot is taken within the panorama picture taking range of the film. The arrangement permits taking pictures by taking full advantage of the spurious telephoto function despite of the current status of the facilities of photofinishing laboratories.

According to the arrangement of the embodiment of this invention, in the spurious telephoto mode, a shot can be taken by using either the left half or the right half of the exposure (shooting) range of one normal shooting frame. In a case where there remains an unexposed frame in the remaining half of the exposure range of one normal shooting frame with a spurious telephoto shot having been taken by using only the left or right half of the normal frame exposure range, another spurious telephoto shot can be taken by using the unexposed frame. Further, in the spurious telephoto mode, the film is fed to the position of an image plane frame set by image plane frame change-over means in such a way as to have a shot taken using either the left half or the right half of the exposure range of one normal mode frame. In a case where a portion of film already wound up includes a shot taken in the spurious telephoto mode by exposing only the left or right half of the exposure range of one normal shooting frame thus leaving the remaining half as an unexposed frame, the film can be fed by film feeding control means to a position where the unexposed frame is opposed to the image plane frame set for this mode in taking another shot in the spurious telephoto mode when it is so desired.

Therefore, shooting can be accomplished in such a way as to attain the spurious telephoto shooting effect of two magnifications without wasting the film.

Further, the embodiment of this invention is arranged such that, in a case where a portion of film already wound up includes a shot taken in the spurious telephoto mode by exposing only one of left and right halves of the exposure range of one normal shooting frame thus leaving the remaining half as an unexposed frame, the film feeding control means computes the number of frames located between the current frame and the unexposed frame and, if the computed number is larger than a predetermined number of frames, causes the film to be fed not to the position where the unexposed frame can be opposed to the image plane frame set but to a position where a next frame can be opposed to the image plane frame set there. The film feeding control means is thus arranged not to rewind the film back to the unexposed frame if the number of frames existing between the current frame and the unexposed frame is larger than the predetermined number of frames, because it would require a relatively long period of time and, in such a case, a shot is taken in the spurious telephoto mode by using a frame located next to the current frame. This arrangement enables the camera operator to take shots in the spurious telephoto mode without missing shooting opportunities.

Further, the embodiment is provided with count means for counting the serial numbers of shots taken and imprinting means for imprinting the contents of the count means at the exposed frames, so that information indicating the serial numbers of shots can be imprinted at applicable exposed frames.

Therefore, even if the spurious telephoto shots are taken without wasting the film, that arrangement allows to find the serial number of the shots without difficulty.

The embodiment further includes image plane frame change-over means which is arranged such that, in the spurious telephoto mode, light blocking plates are inserted into the image plane frame of the normal size from left, right, upper and lower sides of the normal size image plane frame in such a way as to reduce the size of the image plane frame approximately to one half of it. Among the light blocking plates, at least the light blocking plates located in the direction of feeding the film are arranged to have their edges close to the surface of the film when they are inserted into the image plane frame of the normal size. Therefore, when the image plane frame is set for the spurious telephoto mode, the edge parts of at least the right and left light blocking plates are located close to the film surface.

In printing the pictures taken in the spurious telephoto mode, therefore, the border parts between the exposed parts and the peripheral edge parts on the right and left sides of the adjacent prints can be effectively prevented from blurring, as described in the foregoing.

While the described embodiment represents a preferred form of this invention, this invention is not limited to the embodiment. It is to be understood that various modifications and changes may be made as long as the functions attained by the arrangement of the embodiment are attainable without departing from the sprit or scope of the appended claims.

What is claimed is:

1. A camera, comprising:
   a first light blocking member that defines a length in a first direction of a photographic image plane, said first light blocking member changing the length in the first direction of the photographic image plane by selective movement between a first position that light-blocks at least part of the photographic image plane and a second position withdrawn from the first position;
   a second light blocking member that defines a length in a second direction, different from the first direction, of the photographic image plane, said second light blocking member changing the length in the second direction by selective movement between a third position that light-blocks at least part of the photographic image plane and a fourth position withdrawn from the third position, and
   a setting device that permits the second light blocking member to be selectively set in the third position or in the fourth position when the first light blocking member is set in the first position, that permits the second light blocking member to be set in the fourth position when the first light blocking member is set in the second position, and prevents the second light blocking member from being set in the third position when the first light blocking member is set in the second position.

2. A photographic image plane setting apparatus for a camera, comprising:
   a first light blocking member that defines a length in a first direction of a photographic image plane, said first light blocking member changing the length in the first direction of the photographic image plane by selective movement between a first position that light-blocks at least part of the photographic image plane and a second position withdrawn from the first position;
   a second light blocking member that defines a length in a second direction, different from the first direction, of the photographic image plane, said second light blocking member changing the length in the second direction by selective movement between a third position that light-blocks at least part of the photographic image plane and a fourth position withdrawn from the third position, and
   a setting device that permits the second light blocking member to be selectively set in the third position or in the fourth position when the first light blocking member is set in the first position, that permits the second light blocking member to be set in the fourth position when the first light blocking member is set in the second position, and prevents the second light blocking member from being set in the third position when the first light blocking member is set in the second position.

3. An apparatus according to claim 2, wherein said setting device comprises means for setting a photographic image plane in such a way as to have a shot taken on either a left or right half of an exposure area obtained by setting the second light blocking member.

4. An apparatus according to claim 3, further comprising film feeding control means for causing a film to be fed in such a way as to have either the left or right half of the exposure area opposed to an image plane frame obtained when the photographic image plane is set by said setting device.

5. An apparatus according to claim 3, further comprising control means which is arranged such that, if a film includes an incompletely exposed frame where only one of the left and right halves of the exposure area obtained by setting the second light blocking member has been exposed to light leaving the remaining half of the exposure area unexposed, said control means causes the remaining half of the exposure area to be used later for an exposure in taking a shot on the photographic image plane set by said setting device.

6. An apparatus according to claim 5, wherein said control means comprises film feeding control means which is arranged such that, when the photographic image plane is set by said setting device while there is an incompletely exposed frame, said film feeding control mean causes the film to be fed in such a way as to bring the remaining half of the exposure area into a state of being opposed to the photographic image plane set by said setting device.

7. An apparatus according to claim 6, wherein said control means comprises restricting means for restricting said film feeding control means from feeding the film when the number of frames existing between a currently usable frame and the incompletely exposed frame is found to be larger than a predetermined number.

8. An apparatus according to claim 7, wherein said restricting means comprises means for allowing a shot to be taken on a frame located next to the current frame while inhibiting said film feeding control means from feeding the film.

9. An apparatus according to claim 5, wherein said control means comprises storage means for storing information about the presence of the incompletely exposed frame.

10. An apparatus according to claim 5, further comprising count means for counting serial numbers of shots taken, and recording means for recording the contents of said count means.

11. An apparatus according to claim 2, wherein said first light blocking device blocks upper and lower parts of the photographic image plane from light, said light blocking device being arranged to be insertable and retractable into and from an optical path provided for forming the photographic image plane.

12. An apparatus according to claim 2, wherein said second light blocking device blocks at least a part of the photographic image plane from light, said second light blocking device being arranged to be insertable and retractable into and from an optical path provided for forming the photographic image plane.

13. An apparatus according to claim 12, wherein said second light blocking device comprises means for blocking either one of left and right halves of the photographic image plane from light.

14. An apparatus according to claim 2, wherein said setting device comprises means for setting a spurious telephoto photographic image plane which is to be used in a spurious telephoto photographic mode and is arranged to be printed at a different ratio of magnification from a frame of a shot taken on first photographic image plane in a non-spurious telephoto potographic mode.

* * * * *

UNITED STATES PATENT AND TRADEMARK OFFICE
CERTIFICATE OF CORRECTION

PATENT NO. : 5,749,012

DATED : May 5, 1998

INVENTOR(S) : TAKANORI KODAIRA

It is certified that error appears in the above-identified patent and that said Letters Patent is hereby corrected as shown below:

ON THE COVER PAGE

AT [56] - References Cited - FOREIGN PATENT DOCUMENTS:

"3153225" should read --3-153225--; and
"635036" should read --6-35036--.

IN THE DISCLOSURE

COLUMN 2:

Line 18, "and" should read --and is--.

COLUMN 5:

Line 47, "made" should read --mode--;
Line 49, "comes" should read --goes--; and
Line 55, "comes" should read --goes--.

COLUMN 6:

Line 40, "is" should be deleted;
Line 41, "caused to have the film 20" should read --causes the film 20 to be--.

UNITED STATES PATENT AND TRADEMARK OFFICE
CERTIFICATE OF CORRECTION

PATENT NO.  :  5,749,012

DATED       :  May 5, 1998

INVENTOR(S):  TAKANORI KODAIRA

It is certified that error appears in the above-identified patent and that said Letters Patent is hereby corrected as shown below:

COLUMN 8:

Line 14, "pane" should read --plane--;
    Line 17, "of" should read --in--;
    Line 41, "is" should be deleted;
    Line 42, "20," should read --20 to be--; and
    Line 50, "for b" should read --for--.

COLUMN 9:

Line 31, "20" should read --20 to be--; and
    Line 57, "comes" should read --goes--.

COLUMN 10:

Line 15, "is" should read --are--;
    Line 20, "20" should read --20 to be--; and
    Line 30, "come" should read --goes--.

COLUMN 11:

Line 12, "(1)" should read --(l)-- (letter "ell"), and "in" should read --at--;
    Line 13, "of" (first occurrence) should read --in--;
    Line 15, "(1)" should read --(l)-- (letter "ell"; and
    Line 66, "20" should read --20 to be--.

UNITED STATES PATENT AND TRADEMARK OFFICE
CERTIFICATE OF CORRECTION

PATENT NO. : 5,749,012

DATED : May 5, 1998

INVENTOR(S) : TAKANORI KODAIRA

It is certified that error appears in the above-identified patent and that said Letters Patent is hereby corrected as shown below:

COLUMN 12:

Line 19, "of" should read --in--; and (2nd occurrence)
    Line 66, "20" should read --20 to be--.

COLUMN 13:

Line 22, "of" should read --in--. (1st occurrence)

COLUMN 14:

Line 1, "is caused to have" should read --causes--;
    Line 2, "20" should read --20 to be--;
    Line 20, "of" should read --in--;
    Line 41, "is caused to have" should read --causes--, and "20" should read --20 to be--; and
    Line 63, "of" should read --in--. (1st occurrence)

COLUMN 15:

Line 13, "fist" should read --first--;
    Line 24, "is" should be deleted;
    Line 25, "caused to have" should read --causes--, and "20" should read --20 to be--; and
    Line 59, "is caused to have" should read --causes--, and "20" should read --20 to be--.

UNITED STATES PATENT AND TRADEMARK OFFICE
CERTIFICATE OF CORRECTION

PATENT NO. : 5,749,012

DATED : May 5, 1998

INVENTOR(S): TAKANORI KODAIRA

It is certified that error appears in the above-identified patent and that said Letters Patent is hereby corrected as shown below:

COLUMN 16:

Line 22, "comes" should read --goes--;
    Line 30, "20" should read --20 to be--;
    Line 34, "since" should be deleted.
    Line 38, "for" should be deleted; and
    Line 55, "is caused to have" should read --causes--, and "20" should read --20 to be--.

COLUMN 17:

Line 8, "cases" should read --case--;
    Line 10, "foregoing. These" should read --foregoing, these--; and
    Line 32, "like" should read --as--.

COLUMN 18:

Line 4, "20" should read --20 to be--;
    Line 21, "of" should read --in--; and (2nd occurrence)
    Line 47, "is caused to have" should read --causes--, and "20" should read --20 to be--.

COLUMN 19:

Line 2, "of" should read --in--; (2nd occurrence)
    Line 16, "of" should read --in--; (2nd occurrence)
    Line 58, "20" should read --20 to be--; and
    Line 66, "pulse" should read --pulses--.

UNITED STATES PATENT AND TRADEMARK OFFICE
CERTIFICATE OF CORRECTION

PATENT NO. : 5,749,012

DATED : May 5, 1998

INVENTOR(S) : TAKANORI KODAIRA

It is certified that error appears in the above-identified patent and that said Letters Patent is hereby corrected as shown below:

COLUMN 20:

Line 52, "of" should read --in--; and (1st occurrence)
    Line 58, "like" should read --as--.

COLUMN 22:

Line 29, "despite of" should read --despite--.

COLUMN 23:

Line 19, "allows" should read --makes it possible--; and
    Line 45, "sprit" should read --spirit--.

UNITED STATES PATENT AND TRADEMARK OFFICE
CERTIFICATE OF CORRECTION

PATENT NO. : 5,749,012

DATED : May 5, 1998

INVENTOR(S) : TAKANORI KODAIRA

It is certified that error appears in the above-identified patent and that said Letters Patent is hereby corrected as shown below:

COLUMN 24:

Line 56, "mean" should read --means--.

COLUMN 26:

Line 15, "potographic" should read --photographic--.

Signed and Sealed this

Twenty-second Day of December, 1998

Attest:

BRUCE LEHMAN

Attesting Officer     Commissioner of Patents and Trademarks